US 11,295,564 B2

(12) United States Patent
Endo et al.

(10) Patent No.: US 11,295,564 B2
(45) Date of Patent: *Apr. 5, 2022

(54) KEY INFORMATION MANAGEMENT DEVICE, KEY INFORMATION MANAGEMENT METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Masato Endo, Nagakute (JP); Yuichiro Haruna, Oyama (JP); Masaki Oshima, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

This patent is subject to a terminal disclaimer.

(21) Appl. No.: 16/800,571

(22) Filed: Feb. 25, 2020

(65) Prior Publication Data

US 2020/0193751 A1  Jun. 18, 2020

Related U.S. Application Data

(63) Continuation of application No. 16/139,519, filed on Sep. 24, 2018, now Pat. No. 10,614,644.

(30) Foreign Application Priority Data

Oct. 24, 2017 (JP) .............................. JP2017-205675

(51) Int. Cl.
*G07C 9/00* (2020.01)
*H04L 9/08* (2006.01)
(Continued)

(52) U.S. Cl.
CPC ........ *G07C 9/00309* (2013.01); *B60R 25/209* (2013.01); *B60R 25/2018* (2013.01);
(Continued)

(58) Field of Classification Search
CPC ........ H04W 4/50; H04W 4/40; B60R 25/209; B60R 25/24; B60R 25/241; G07C 9/00571; G07C 2009/00452; G07C 9/00309

See application file for complete search history.

(56) References Cited

U.S. PATENT DOCUMENTS 9,189,900 B1 11/2015 Penilla et al.
9,365,188 B1  6/2016 Penilla et al.
(Continued)

FOREIGN PATENT DOCUMENTS

CN  103946898 A  7/2014
JP  2006118122 A  5/2006
(Continued)

*Primary Examiner* — Thomas D Alunkal
(74) *Attorney, Agent, or Firm* — Hunton Andrews Kurth LLP

(57) ABSTRACT

A key information management device includes an information processing device. The information processing device is configured to deliver key information to a mobile terminal as the mobile terminal transmits a predetermined transmission signal toward a vehicle. The key information is information for unlocking the vehicle, starting the vehicle, or unlocking and starting the vehicle. The information processing device is configured to register permission for a user of the vehicle to use a predetermined service using the vehicle. The permission is permission to cause the information processing device to deliver the key information to a mobile terminal of a third party concerned with the predetermined service, other than the user of the vehicle.

7 Claims, 10 Drawing Sheets

(51) Int. Cl.
*G06Q 10/08* (2012.01)
*B60R 25/20* (2013.01)
*B60R 25/24* (2013.01)
*H04W 4/40* (2018.01)
*H04W 4/50* (2018.01)
*H04W 12/06* (2021.01)
*H04W 12/08* (2021.01)
*H04L 67/12* (2022.01)

(52) U.S. Cl.
CPC ............ *B60R 25/24* (2013.01); *B60R 25/241* (2013.01); *G06Q 10/0832* (2013.01); *G07C 9/00571* (2013.01); *H04L 9/088* (2013.01); *H04L 9/0891* (2013.01); *H04W 4/40* (2018.02); *H04W 4/50* (2018.02); *H04W 12/06* (2013.01); *H04W 12/08* (2013.01); *G07C 2009/00452* (2013.01); *G07C 2009/00468* (2013.01); *G07C 2009/00547* (2013.01); *G07C 2009/00769* (2013.01); *H04L 67/12* (2013.01)

(56) References Cited

U.S. PATENT DOCUMENTS

| | | | |
|---|---|---|---|
| 9,499,129 B1 | 11/2016 | Penilla et al. | |
| 10,614,644 B2 * | 4/2020 | Endo | H04L 9/0891 |
| 2011/0191126 A1 | 8/2011 | Hampshire et al. | |
| 2013/0321178 A1 | 12/2013 | Jameel et al. | |
| 2014/0222298 A1 | 8/2014 | Gurin | |
| 2014/0232524 A1 | 8/2014 | Nakai et al. | |
| 2015/0310532 A1 * | 10/2015 | Gura | G06Q 50/30 705/7.13 |
| 2015/0343993 A1 | 12/2015 | Ferrieres et al. | |
| 2016/0055699 A1 | 2/2016 | Vincenti | |
| 2016/0098870 A1 * | 4/2016 | Bergerhoff | B60R 25/2018 340/5.61 |
| 2016/0098871 A1 * | 4/2016 | Oz | H04L 63/06 340/5.61 |
| 2016/0189098 A1 * | 6/2016 | Beaurepaire | H04W 12/084 705/337 |
| 2017/0178035 A1 | 6/2017 | Grimm et al. | |
| 2017/0334395 A1 | 11/2017 | Lu et al. | |
| 2019/0001925 A1 | 1/2019 | Arakawa et al. | |
| 2019/0005445 A1 * | 1/2019 | Bahrainwala | G06Q 10/08 |

FOREIGN PATENT DOCUMENTS

| | | |
|---|---|---|
| JP | 2006206225 A | 8/2006 |
| JP | 2006233475 A | 9/2006 |
| JP | 2011044112 A | 3/2011 |
| JP | 2015045141 A | 3/2015 |
| JP | 2016511191 A | 4/2016 |
| WO | 2016054276 A1 | 4/2016 |
| WO | 2016150532 A1 | 9/2016 |

* cited by examiner

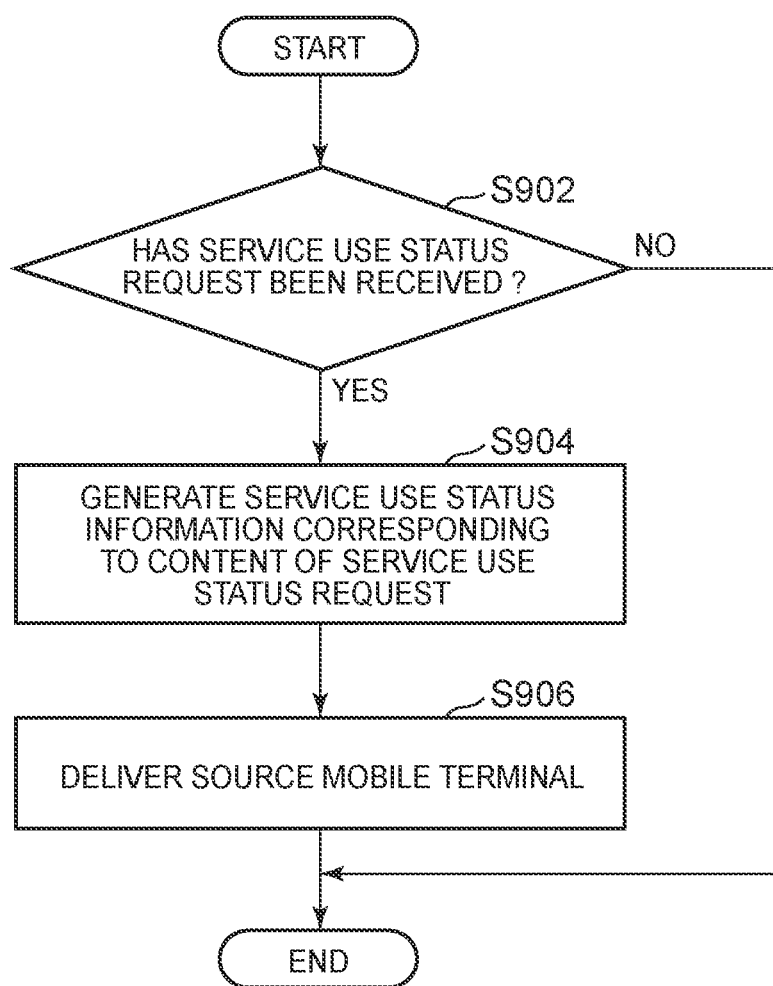

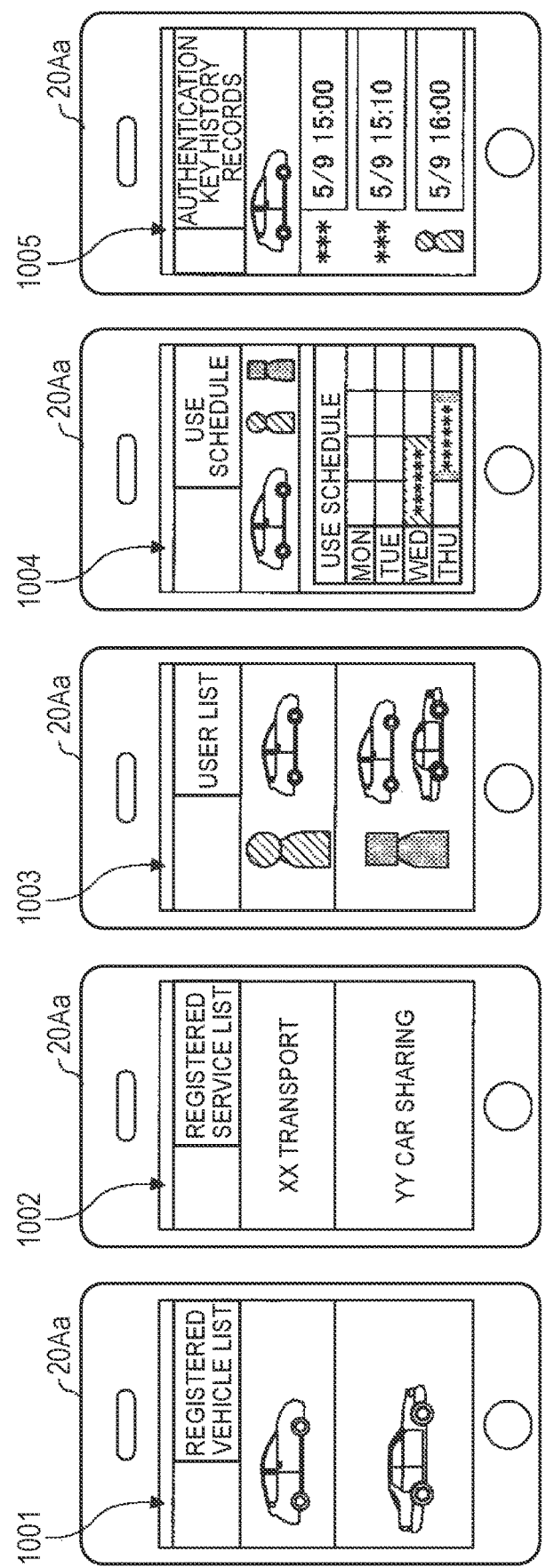

KEY INFORMATION MANAGEMENT DEVICE, KEY INFORMATION MANAGEMENT METHOD, AND NON-TRANSITORY COMPUTER-READABLE RECORDING MEDIUM

INCORPORATION BY REFERENCE

This is a continuation application of U.S. patent application Ser. No. 16/139,519, filed Sep. 24, 2018, which claims priority to Japanese Patent Application No. 2017-205675 filed on Oct. 24, 2017, the entire contents of which all are incorporated herein by reference.

BACKGROUND

1. Technical Field

The disclosure relates to a key information management device, a key information management method, and a non-transitory computer-readable recording medium on which a key information management program is recorded.

2. Description of Related Art

For example, a key information management system is disclosed (see, for example, Japanese Unexamined Patent Application Publication No. 2006-118122 (JP 2006-118122 A). In the key information management system, a mobile terminal receives key information that is transmitted from a server, and then the mobile terminal is usable as an electronic key.

SUMMARY

When key information that allows a vehicle to be unlocked for a limited time is delivered to a mobile terminal of a person other than a regular user of the vehicle, it is conceivable that various services can be provided to the regular user of the vehicle. For example, there is a car sharing service that assists in renting a vehicle between individuals (consumer to consumer (C2C)) (hereinafter, referred to as C2C car sharing service). The C2C car sharing service is provided in the following way. In a time period during which a regular user does not use the vehicle, key information that allows a vehicle to be unlocked and started for a limited time is delivered to a mobile terminal of a person who wants to temporarily rent the vehicle. There is also, for example, a delivery service that allows the trunk of a vehicle to be designated as a delivery address for a package (hereinafter, referred to as trunk delivery service). The trunk delivery service is provided in the following way. Key information that allows the trunk of a vehicle to be unlocked for a limited time is delivered to a mobile terminal of a delivery person of a delivery company.

However, for example, if various services become available only by registering information for identifying a vehicle, such as a vehicle index number (VIN), with service providers, a third party, that is, a service provider, could learn registered information for identifying a vehicle when a regular user of the vehicle uses a service. For this reason, information for identifying a vehicle is possibly abused by a third party in bad faith, and another service is registered by the third party in bad faith without permission or a vehicle is used by the third party in bad faith without permission through a service registered without permission.

The disclosure provides a key information management device, a key information management method, and a non-transitory computer-readable recording medium on which a key information management program is recorded, which are able to prevent registration with a service using a vehicle by a third party in bad faith without permission and usage of a vehicle by a third party in bad faith without permission through a service registered without permission.

A first aspect of the disclosure provides a key information management device. The key information management device includes an information processing device. The information processing device is configured to deliver key information to a mobile terminal as the mobile terminal transmits a predetermined transmission signal toward a vehicle. The key information is information for unlocking the vehicle, starting the vehicle, or unlocking and starting the vehicle. The information processing device is configured to register permission for a user of the vehicle to use a predetermined service using the vehicle. The permission is permission to cause the information processing device to deliver the key information to a mobile terminal of a third party concerned with the predetermined service, other than the user of the vehicle, as an external device concerned with the predetermined service transmits a predetermined request signal.

According to the above aspect, the key information management device by itself is able to manage permission to cause an external device concerned with a service, such as a C2C car sharing service and a trunk delivery service, to deliver key information to a mobile terminal of a third party concerned with the service, such as a renter of a vehicle and a delivery person. For this reason, for example, even when authentication information, such as ID and password, that an external device causes the information processing device to deliver key information has leaked, since the ID and password is unique to a service, it is not possible to perform registration with a new service by using the authentication information. In addition, the key information management device normally often restricts access from a person other than a user of a vehicle, and it is originally difficult for a third party in bad faith to perform registration with a service with the use of the key information management device. Therefore, the key information management device is able to reduce registration with a service using a vehicle by a third party in bad faith without permission and usage of a vehicle by a third party in bad faith without permission through a service registered without permission.

In the above-described aspect, the information processing device may be configured to register the permission further in association with unique information corresponding to an owner user of the vehicle.

According to this aspect, the key information management device is able to manage permission to cause an external device to deliver key information to a mobile terminal of a third party concerned with a service, other than a user of a vehicle, further in association with unique information that corresponds to an owner user and that is normally only available to the owner user. Therefore, since unique information corresponding to an owner user is required at the time of registration with a service, the key information management device is able to reduce, for example, registration with a service using a vehicle by a user of the vehicle, other than an owner user, (for example, a member of a family of an owner user, a close friend of an owner user, or the like) without permission.

In the above-described aspect, the information processing device may be configured to transmit information related to the predetermined service to the mobile terminal having the unique information corresponding to the owner user in response to a request from the mobile terminal, and the predetermined service may correspond to the permission associated with the unique information corresponding to the owner user.

According to this aspect, the key information management device is able to transmit information related to a registered service to a terminal of an owner user in response to a request from the terminal having unique information corresponding to the owner user, that is, a request from the terminal of the owner user. For this reason, an owner user is allowed to see information related to registered services (for example, a list of registered services, a use schedule of a vehicle that is used by the services, and the like) that are displayed on a display, or the like, of a terminal. Therefore, the key information management device is able to cause an owner user to monistically see information related to registered services.

In the above-described aspect, the information processing device may be configured to store the permission for each user of the vehicle in association with the unique information corresponding to the owner user, the information processing device may be configured to transmit information related to a user of the vehicle, other than the owner user, to the mobile terminal having the unique information corresponding to the owner user in response to a request from the mobile terminal, and the user of the vehicle, other than the owner user, may correspond to the permission associated with the unique information corresponding to the owner user.

According to this aspect, the key information management device is able to transmit information related to a user of a vehicle, other than an owner user, who uses a registered service to a terminal of the owner user in response to a request from the terminal of the owner user. For this reason, an owner user is allowed to see information related to users of a vehicle, other than the owner user, who use registered services (for example, a list of users of various services, a use schedule of a vehicle over all the users, and the like) that are displayed on a display, or the like, of a terminal. Therefore, the key information management device is able to cause an owner user to monistically see information related to users of registered services (users of a vehicle, other than the owner user).

A second aspect of the disclosure may be implemented by a key information management method that is executed by a key information management device. The key information management method includes: delivering key information to a mobile terminal as the mobile terminal transmits a predetermined transmission signal toward a vehicle, the key information being information for unlocking the vehicle, starting the vehicle, or unlocking and starting the vehicle; and registering permission for a user of the vehicle to use a predetermined service using the vehicle, the permission being permission to deliver the key information to a mobile terminal of a third party concerned with the predetermined service, other than the user of the vehicle, as an external device concerned with the predetermined service transmits a predetermined request signal.

A third aspect of the disclosure may be implemented by a non-transitory computer-readable recording medium on which a key information management program is recorded. The key information management program causes an information processing device to execute instructions for: delivering key information to a mobile terminal as the mobile terminal transmits a predetermined transmission signal toward a vehicle, the key information being information for unlocking the vehicle, starting the vehicle, or unlocking and starting the vehicle; and registering permission for a user of the vehicle to use a predetermined service using the vehicle, the permission being permission to deliver the key information to a mobile terminal of a third party concerned with the predetermined service, other than the user of the vehicle, as an external device concerned with the predetermined service transmits a predetermined request signal.

According to the above-described aspects, it is possible to provide a key information management device, a key information management method, and a non-transitory computer-readable recording medium on which a key information management program is recorded, which are able to prevent registration with a service using a vehicle by a third party in bad faith without permission and usage of a vehicle by a third party in bad faith without permission through a service registered without permission.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a flowchart that schematically shows an example of a service use status information providing process that is executed by the center server; and FIG. 10 is a view that shows specific examples of service use status images that are displayed on a display of a mobile terminal of an owner user.

DETAILED DESCRIPTION OF EMBODIMENTS

Hereinafter, an embodiment of the disclosure will be described with reference to the accompanying drawings.

Overall Configuration of Authentication Key Management System

Figure 1:
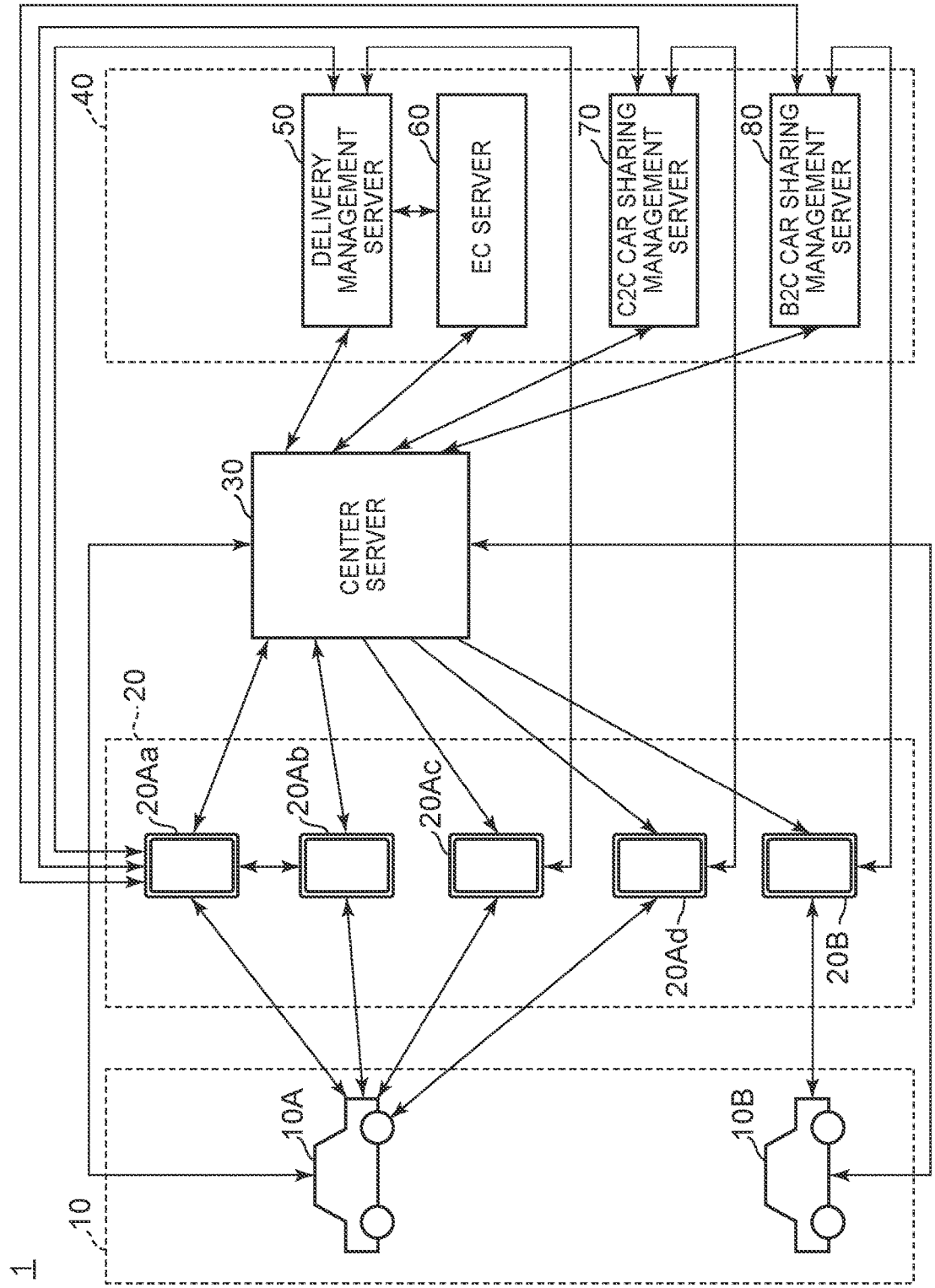
FIG. 1 is a diagram that shows an example of the overall configuration of an authentication key management system.

FIG. 1 is a diagram that shows an example of the overall configuration of an authentication key management system according to the present embodiment.

The authentication key management system 1 includes vehicles 10, mobile terminals 20, a center server 30, and service management servers 40.

Each vehicle 10 is able to carry out wireless communication within a relatively close range (a range to such an extent that communication is available between the inside of a vehicle cabin and the outside of the vehicle cabin) to the mobile terminals 20 (hereinafter, referred to as near-field communication) in conformity with predetermined communication standards. Each vehicle 10 is an object of which doors are locked or unlocked and that is started (ignition is turned on) based on a transmission signal (an authentication request, a lock request, or an unlock request, which will be described later) from one of the mobile terminals 20. The doors of each vehicle 10 may include not only passenger doors but also a luggage compartment door (for example, a trunk lid, a back door, or the like) for accessing a trunk (luggage compartment). Turning on the ignition (IG-ON) of each vehicle 10 may include not only startup of an engine in the vehicle 10 that uses the engine as a main power source but also power on of an electric motor in the vehicle 10 that uses an electric motor as a main power source. Hereinafter, in the present embodiment, description will be made on the assumption that each vehicle 10 uses an engine 117 (described later) as a main power source, a start (IG-ON) of each vehicle 10 corresponds to a startup of the engine 117 and a stop (IG-OFF) of each vehicle 10 corresponds to a stop of the engine 117.

The vehicles 10 are communicably connected to the center server 30 through a predetermined communication network (for example, a mobile telephone network having a large number of base stations as terminals, the Internet, or the like). Each vehicle 10 transmits location information to the center server 30, as will be described later.

The vehicles 10 include a privately-owned vehicle 10A and a vehicle 10B owned by a B2C car sharing service provider.

The mobile terminals 20 are communicably connected to the center server 30 through a predetermined communication network (for example, a mobile telephone network having a large number of base stations as terminals, the Internet, or the like). Each mobile terminal 20 is able to unlock or lock the intended vehicle 10 by acquiring authentication key information (an example of key information; hereinafter, referred to as authentication key) that is delivered from the center server 30 and transmitting the acquired authentication key by relatively close-range wireless communication in response to a predetermined operation of a user. Each mobile terminal 20 may be, for example, a general cellular phone, a smartphone, or a tablet terminal. Each mobile terminal 20 may implement the above-described function by launching a predetermined application program (hereinafter, referred to as key application) that is installed onto a built-in processing device 23, as will be described later. Each mobile terminal 20 may be a portable special-purpose terminal specialized to acquire an authentication key from the center server 30, and to unlock the doors of the intended vehicle 10 and start the intended vehicle 10 with the use of the acquired authentication key. The mobile terminals 20 include mobile terminals 20Aa, 20Ab, 20Ac, 20Ad corresponding to the vehicle 10A, and a mobile terminal 20B corresponding to the vehicle 10B.

The mobile terminal 20Aa is a mobile terminal owned by an owner (owner user) among regular users of the vehicle 10A. The mobile terminal 20Aa may be bidirectionally communicable with the mobile terminal 20Ab by relatively close-range wireless communication.

The mobile terminal 20Ab is a mobile terminal owned by each of the regular users other than the owner user of the vehicle 10A (for example, including a member of a family of the owner user, a close friend of the owner user, and the like; hereinafter, referred to as child users).

The child users may include a user who does not drive the vehicle 10A and a user who is not permitted to drive the vehicle 10A (for example, a child under 18 years of age of the owner user, or the like). For example, when only a trunk delivery service (described later) is used, the regular users do not need to drive the vehicle 10A.

The mobile terminal 20Ac is owned by a delivery person of a business operator that provides a trunk delivery service (described later) (hereinafter, simply referred to as delivery service provider). The mobile terminal 20Ac is communicably connected to the center server 30 and a delivery management server 50 (described later) through a predetermined communication network (for example, a mobile telephone network having a large number of base stations as terminals, the Internet, or the like).

The mobile terminal 20Ad is a mobile terminal owned by a renter of the vehicle 10A in a C2C car sharing service (described later). The mobile terminal 20Ad is communicably connected to the center server 30 and a C2C car sharing management server 70 (described later) through a predetermined network (for example, a mobile telephone network having a large number of base stations as terminals, the Internet, or the like).

The mobile terminal 20B is a mobile terminal owned by a renter of the vehicle 10B in a B2C car sharing service (described later). The mobile terminal 20B is communicably connected to the center server 30 and a B2C car sharing management server 80) through a predetermined communication network (for example, a mobile telephone network having a large number of base stations as terminals, the Internet, or the like).

The center server 30 is communicably connected to the vehicles 10, the mobile terminals 20, and the service management servers 40.

The center server 30 (an example of a key information management device) manages issuance of an authentication key of each vehicle 10. For example, the center server 30 issues an authentication key and delivers the authentication key to the intended mobile terminal 20 in response to a predetermined condition.

The center server 30 also acquires location information of each vehicle 10 from the vehicle 10. Thus, the center server 30 is able to get the location of each vehicle 10.

The center server 30 also operates a car sharing service for sharing the vehicle 10A among the plurality of regular users including the owner user of the vehicle 10A. Specifically, the center server 30 operates an authentication key sharing service (key sharing service) that each of the registered regular users, including the owner user, is allowed to acquire the authentication key of the vehicle 10A into his or her own mobile terminal 20 (the mobile terminal 20Aa or the mobile terminal 20Ab).

The center server 30 also executes a registration process for the regular users of the vehicle 10A to use a service using the vehicle 10A (the key sharing service, the trunk delivery service, the C2C car sharing service, or the like). Specifically, the center server 30 registers permission for the regular users of the vehicle 10A to use a service using the vehicle 10A. The permission is permission to deliver an authentication key to a predetermined mobile terminal 20 (hereinafter, referred to as authentication key arrangement permission) as one of a key sharing management unit 327 (described later) and the service management servers 40 transmits an authentication key arrangement request (described later) to the center server 30.

The center server 30 also manages the use of the vehicle 10A among a plurality of services (that is, a plurality of business operators), such as the trunk delivery service (described later) and the C2C car sharing service (described later).

The service management servers 40 manage operations of various services that are provided by using the vehicles 10. The service management servers 40 include the delivery management server 50 and an electronic commerce (EC) server 60 that correspond to the trunk delivery service, the C2C car sharing management server 70 that corresponds to the C2C car sharing service, and the B2C car sharing management server 80 that corresponds to the B2C car sharing service.

The trunk delivery service may include a delivery service for dealing with products ordered on an EC site (described later) as delivery items and a delivery service for dealing with items other than the products ordered on the EC site as delivery items. The latter trunk delivery service is, for example, a service that allows the regular users of the vehicle 10A to change the delivery address to the trunk of the vehicle 10A when a notification that a package addressed to home is scheduled to be delivered has been provided from the delivery management server 50 to the regular user through an electric mail, an account of a social networking service (SNS), or a specific application program that is launched on the mobile terminal 20Aa or the mobile terminal 20Ab. Hereinafter, in the present embodiment, the former trunk delivery service will be mainly described. The operations of components related to the trunk delivery service (described later) are also applicable to the operations of components related to the latter trunk delivery service where appropriate.

The delivery management server 50 is communicably connected to the mobile terminal 20Ac and the center server 30 through a predetermined communication network. The delivery management server 50 manages operations of a logistics system associated with the trunk delivery service from receipt of a package to delivery of the package to the trunk of the vehicle 10A.

The delivery service provider that operates the delivery management server 50 may provide the regular users of the vehicle 10A with not only the trunk delivery service but also a pickup service that allows the trunk to be designated as a pickup address for a package (hereinafter, referred to as trunk pickup service). That is, the delivery management server 50 may manage operations of the trunk pickup service instead of or in addition to the trunk delivery service. In this case, a package that is a pickup item may be a product that is returned to an operator of the EC site (or a shop opened on the EC site) corresponding to the EC server 60 (that is, a product purchased on the EC site) or may be a package for delivery irrelevant to the EC site. The trunk pickup service may be realized as a pickup service at the time when a business operator that provides a service for temporarily keeping an article from a customer (for example, a business operator, such as a commercial laundry) picks up a package from the regular user of the vehicle 10A. In this case, a pickup management server that manages operations of the trunk pickup service, which may be included in the service management servers 40, as well as the delivery management server 50, may be provided by a commercial laundry provider. That is, the pickup management server may be provided instead of or in addition to the delivery management server 50. A business operator that provides a service for collecting a predetermined article (an article, such as junk and a second-hand book that a customer desires to sell) from a customer (for example, a recycle service provider, an antique buyer, or the like) provides the regular users of the vehicle 10A with a collection service that allows the trunk to be designated as a collection address of an article that is a collection item (hereinafter, referred to as trunk collection service). In this case, a collection management server that manages operations of the trunk collection service, which may be included in the service management servers 40, as well as the delivery management server 50, may be provided by a recycle service provider, or the like. That is, the collection management server may be provided instead of or in addition to the delivery management server 50.

The EC server 60 is communicably connected to the center server 30 and the delivery management server 50 through a predetermined communication network, and operates a predetermined website (EC site) that sells products or services. Specifically, the EC server 60 displays the trunk of the vehicle 10A as a choice for delivery address on an order page of the EC site for the pre-registered regular users of the vehicle 10A and the delivery service provider (the delivery service provider corresponding to the delivery management server 50). Thus, the regular users of the vehicle 10A are allowed to get delivery of purchased products to the trunk of the vehicle 10A even when the regular users are not at home.

The C2C car sharing management server 70 is communicably connected to the mobile terminal 20Ad and the center server 30. The C2C car sharing management server 70 manages operations of the C2C car sharing service, such as receiving registration of a rentable date and time of the vehicle 10A from the owner user, receiving a reservation for use from a person who wants to rent the vehicle 10A, and arrangements for the authentication key of the vehicle 10A. The C2C car sharing management server 70 may manage operations of a C2C trunk sharing service for renting the cabin or trunk of the privately-owned vehicle 10A as a temporary luggage storage, a delivery address for a package, or the like.

The B2C car sharing management server 80 is communicably connected to the mobile terminal 20B and the center server 30. The B2C car sharing management server 80 manages operations of the B2C car sharing service, such as receiving a reservation for use of the vehicle 10B and making arrangements for a parking location of the vehicle 10B and the authentication key of the vehicle 10B. The B2C car sharing management server 80 may manage operations of a B2C trunk sharing service for renting the cabin or trunk of the vehicle 10B as a temporary luggage storage or a delivery address for a package.

The service management servers 40 may include a company car management server that operates a car sharing service (company car management service) that the vehicle 10 that is a company car of a company is intended for a reservation for use and an employee of the company is a borrower, instead of or in addition to the B2C car sharing management server 80. At this time, when there is an idle time period of the vehicle 10 that is a company car, the company car management server may operate a C2C car sharing service that the vehicle 10 that is a company car is intended for rent. The delivery management server 50 and the EC server 60 may operate a trunk delivery service that allows the trunk of the vehicle 10 that is a company car of a company to be designated as a delivery address for a package that is delivered to the company.

Detailed Components Related to Locking and Unlocking of Vehicle and Starting of Vehicle Next, components related to locking and unlocking of each vehicle 10 and starting of each vehicle 10 in the authentication key management system 1 will be described with reference to FIG. 2.

Figure 2:
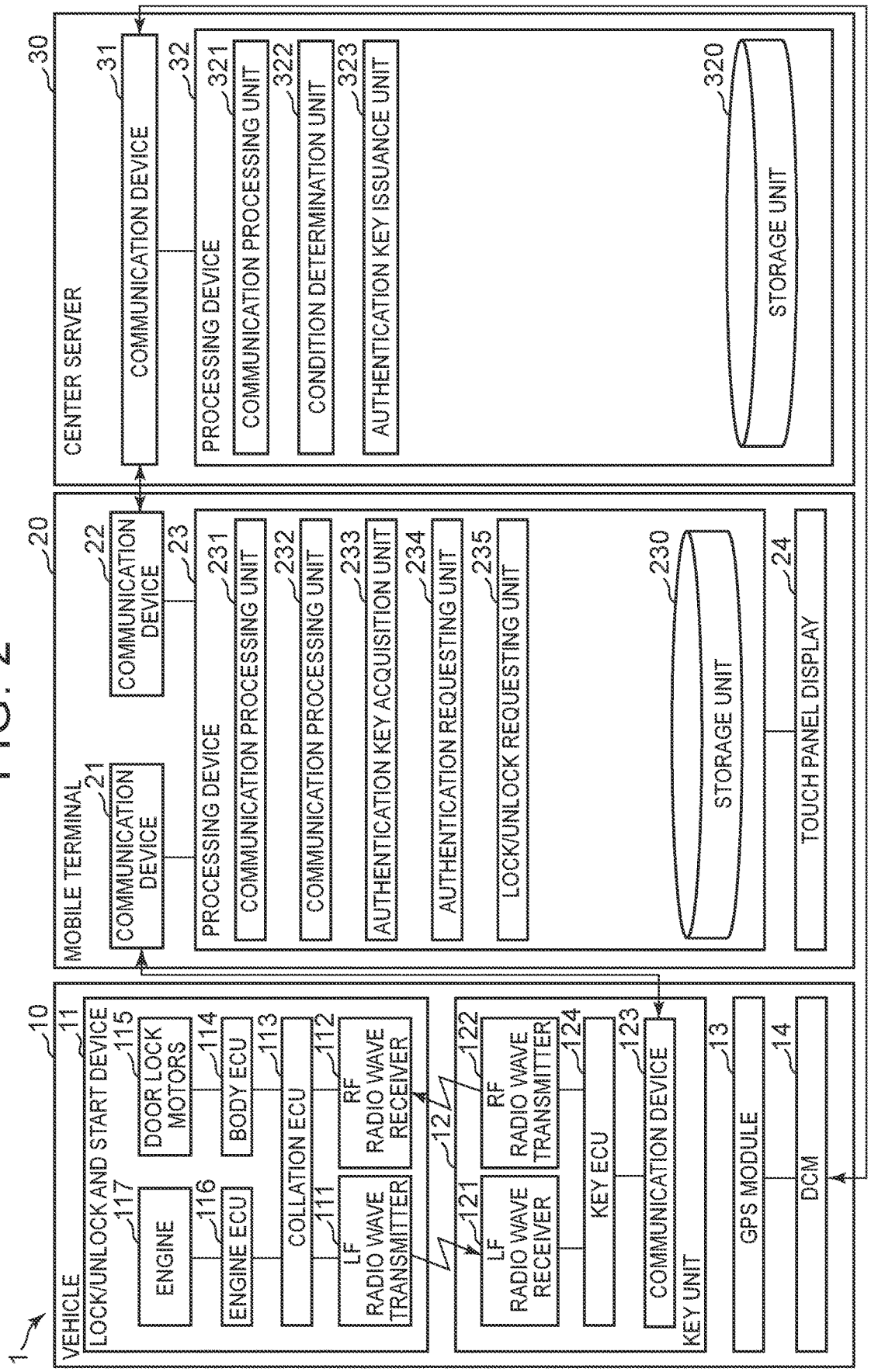
FIG. 2 is a block diagram that mainly shows an example of components related to locking and unlocking of a vehicle in the authentication key management system.

FIG. 2 is a block diagram that mainly shows an example of components related to locking and unlocking of each vehicle 10 and starting of each vehicle 10 in the authentication key management system 1. Each vehicle 10 includes a lock/unlock and start device 11, a key unit 12, a GPS module 13, and a data communication module (DCM) 14.

The lock/unlock and start device 11 is installed on the vehicle 10, and locks or unlocks the doors of the vehicle 10 in response to a lock signal or unlock signal that is transmitted from the key unit 12 as radio waves of a radio-frequency (RF) band (for example, 300 MHz to 3 GHz) (hereinafter, referred to as RF radio waves). The lock/unlock and start device 11 starts the vehicle 10 in response to an exchange of radio waves of a low-frequency (LF) band (for example, 30 Hz to 300 kHz) (hereinafter, referred to as LF radio waves) and RF radio waves with the key unit 12 with a trigger set to a depressing operation of a start switch (not shown) provided in the cabin of the vehicle 10. The lock/unlock and start device 11 includes an LF radio wave transmitter 111, an RF radio wave receiver 112, a collation electronic control unit (ECU) 113, a body ECU 114, door lock motors 115, an engine ECU 116, and the engine 117 that is a driving force source of the vehicle 10.

The lock/unlock and start device 11 is activated by electric power that is supplied from an auxiliary battery (not shown) mounted on the vehicle 10.

The LF radio wave transmitter 111 is incorporated in, for example, a center console or a door handle in the cabin, and transmits LF radio waves under control of the collation ECU 113.

The RF radio wave receiver 112 is provided in, for example, a trim in the trunk of the vehicle 10, and receives RF radio waves under control of the collation ECU 113.

The collation ECU 113 is an electronic control unit that controls locking and unlocking of the doors of the vehicle 10 and starting of the vehicle 10 based on an exchange of signals with the key unit 12. The collation ECU 113 is implemented by hardware, software, or a combination of hardware and software. For example, the collation ECU 113 is mainly formed of a microcomputer including a central processing unit (CPU), a random access memory (RAM), a read only memory (ROM), an auxiliary storage device, a real time clock (RTC), and a communication interface. The collation ECU 113 implements various control processes by executing various programs stored in the ROM or the auxiliary storage device on the CPU. Hereinafter, the same applies to a key ECU 124 (described later).

The collation ECU 113 receives an unlock signal and a lock signal that are transmitted from the key unit 12 as RF radio waves with the use of the RF radio wave receiver 112.

When the collation ECU 113 has received the unlock signal or the lock signal, the collation ECU 113 authenticates the source (key unit 12) of the unlock signal or lock signal based on key information (hereinafter, referred to as internal key information) included in the unlock signal or the lock signal. For example, when internal key information that is registered in advance in an internal memory, such as the auxiliary storage device, matches the internal key information included in the unlock signal or the lock signal, the collation ECU 113 determines that authentication is successful. On the other hand, when those pieces of internal key information do not match each other, the collation ECU 113 determines that authentication has failed.

For example, the collation ECU 113 may transmit LF radio waves, including "challenge" generated by a predetermined method by utilizing the internal key information of the internal memory, from the LF radio wave transmitter 111 toward the key unit 12, and may perform challenge-response authentication based on "response" that has been returned from the key unit 12 and that is received by the RF radio wave receiver 112.

When authentication is successful, the collation ECU 113 transmits an unlock instruction (upon reception of the unlock signal) or a lock instruction (upon reception of the lock signal) to the body ECU 114 through an in-vehicle network, such as a controller area network (CAN).

As will be described later, in the unlock signal, only part of the doors of the vehicle 10 may be designated as a door to be unlocked. In this case, the collation ECU 113 designates the door(s) to be unlocked with the unlock instruction. Thus, the body ECU 114 is able to unlock part of the doors by activating only the door lock motor(s) 115 corresponding to the designated part of the doors.

When the start switch has been depressed, the collation ECU 113 authenticates the key unit 12 by exchanging signals with the key unit 12 with the use of the LF radio wave transmitter 111 and the RF radio wave receiver 112.

For example, the collation ECU 113 transmits an LF-band request signal for requesting a reply of the internal key information from the LF radio wave transmitter 111 toward the key unit 12. When the response signal including the internal key information has been received from the key unit 12 by the RF radio wave receiver 112, the collation ECU 113 determines whether authentication is successful or authentication has failed based on matching between the internal key information registered in the internal memory in advance and the internal key information included in the response signal, as in the case of locking or unlocking of the doors.

For example, the collation ECU 113 may perform challenge-response authentication, as in the case of locking or unlocking of the doors.

When authentication is successful, the collation ECU 113 transmits an instruction to start the engine 117 to the engine ECU 116 through the in-vehicle network, such as the CAN.

The body ECU 114 is an electronic control unit that controls actuation of each of the door lock motors 115 that are communicably connected to the body ECU 114 via one-to-one communication lines, or the like. The body ECU 114 outputs a control instruction to cause the door lock motors 115 to perform unlocking action in response to the unlock instruction from the collation ECU 113. The body ECU 114 also outputs a control instruction to cause the door lock motors 115 to perform locking action in response to the lock instruction from the collation ECU 113.

Each of the door lock motors 115 is a known electric actuator that unlocks or locks a corresponding one of the doors of the vehicle 10 in response to a control instruction from the body ECU 114.

The engine ECU 116 is an electronic control unit that controls the drive of the engine 117. Specifically, the engine ECU 116 controls the drive of various actuators, such as a starter and an injector, mounted on the engine 117. When a start instruction has been input from the collation ECU 113, the engine ECU 116 causes the engine 117 to start by outputting a control instruction to the various actuators, such as the starter and injector of the engine 117.

The key unit 12 is disposed in the cabin of the vehicle 10. The key unit 12 transmits any one of the unlock signal and the lock signal as RF radio waves to the lock/unlock and start device 11 in response to a corresponding one of the unlock request and the lock request, which is transmitted from the mobile terminal 20. In addition, at the time when the start switch provided in the cabin of the vehicle 10 has been depressed, the key unit 12 exchanges signals with the lock/unlock and start device 11 in response to an LF-band signal that is transmitted from the lock/unlock and start device 11. The key unit 12 includes an LF radio wave receiver 121, an RF radio wave transmitter 122, a communication device 123, and the key ECU 124.

The key unit 12 may be disposed at a location at which the key unit 12 is difficult to be visually recognized from users seated on respective seats of the vehicle 10 (for example, inside a glove box or center console box, or the like). The key unit 12 may be fixed to the vehicle 10 or may be not fixed. The key unit 12 may be actuated by a built-in button battery, or the like, or may be actuated by electric power that is supplied from an auxiliary battery mounted on the vehicle 10.

The LF radio wave receiver 121 receives LF radio waves under control of the key ECU 124.

The RF radio wave transmitter 122 transmits RF radio waves under control of the key ECU 124.

The communication device 123 is any device that carries out near-field communication with the mobile terminals 20 under control of the key ECU 124. The communication device 123 may be, for example, a BLE communication module that carries out communication with the mobile terminals 20 in conformity with the BLE communication standards. The BLE is an abbreviation of Bluetooth low energy. Bluetooth is a registered trademark. Hereinafter, description will be made on the assumption that the communication standards employed in the communication device 123 adhere to BLE communication.

The communication device 123 may be a communication device that adheres to close-range communication standards for a significantly short communicable range, such as near-field communication (NFC) standards. In this case, the communication device 123 may be incorporated at a location close to a body surface outside the cabin of the vehicle 10 (that is, for example, a location inside a door handle). Thus, even when a communicable range of the communication device 123 is significantly short, the key unit 12 (key ECU 124) is able to carry out communication with the mobile terminals 20 outside the cabin.

The key ECU 124 is an electronic control unit that executes a control process of transmitting any one of the lock signal and the unlock signal to the lock/unlock and start device 11 in response to a corresponding one of the lock request and the unlock request, which is received from the mobile terminal 20.

The key ECU 124 receives an authentication request including an authentication key associated with the key unit 12 from the mobile terminal 20 through the communication device 123.

When an authentication request including the authentication key associated with the key unit 12 has been received from the mobile terminal 20, the key ECU 124 authenticates the mobile terminal 20 based on the authentication key. When the authentication is successful, the key ECU 124 reconstitutes the internal key information stored in the internal memory, such as the auxiliary storage device, into a usable state. The internal key information is stored in a state where the internal key information is not usable as a use for authentication in the lock/unlock and start device 11, such as an inaccessible state and an encrypted state. For this reason, when authentication of the mobile terminal 20 is successful, the key ECU 124, for example, changes access permission to the internal memory for changing the key information into an accessible state or decodes the encrypted internal key information based on the authentication key. Thus, the key ECU 124 is able to transmit an unlock signal or lock signal, including the internal key information, to the lock/unlock and start device 11 by accessing the normally inaccessible internal key information, or transmit an unlock signal or lock signal, including the decoded internal key information, to the lock/unlock and start device 11. For this reason, the lock/unlock and start device 11 is able to perform appropriate authentication based on the internal key information included in the unlock signal or the lock signal. Even if there occurs a situation in which a third party in bad faith illegally gets hold of the key unit 12, since the internal key information in the key unit 12 is, for example, inaccessible or encrypted, it is possible to reduce occurrence of a theft of the vehicle 10.

The key ECU 124 also receives an unlock request and a lock request from the mobile terminal 20 through the communication device 123. When authentication of the mobile terminal 20 is successful (specifically, after authentication of the mobile terminal 20 is successful, BLE communication is continuously established) and the key ECU 124 has received an unlock request or a lock request from the mobile terminal 20, the key ECU 124 transmits an unlock signal or lock signal, including lock/unlock key information, to the lock/unlock and start device 11 through the RF radio wave transmitter 122.

Thus, after an authentication process in the lock/unlock and start device 11, the doors of the vehicle 10 are unlocked or locked.

As described above, at the time when the start switch provided in the cabin of the vehicle 10 has been depressed, the key ECU 124 exchanges signals with the lock/unlock and start device 11 in response to an LF-band signal that is transmitted from the lock/unlock and start device 11.

For example, when the request signal has been received from the lock/unlock and start device 11 by the LF radio wave receiver 121, the key ECU 124 transmits a response signal including the internal key information stored in the internal memory, or the like, toward the lock/unlock and start device 11 through the RF radio wave transmitter 122.

For example, when LF radio waves including "challenge" have been received from the lock/unlock and start device 11 by the LF radio wave receiver 121, the key ECU 124 generates "response" based on the internal key information, and transmits the "response" to the lock/unlock and start device 11 through the RF radio wave transmitter 122.

Thus, after the authentication process in the lock/unlock and start device 11, the engine 117 is started.

Permission related to the function of locking or unlocking the vehicle 10 or starting the vehicle 10 may be defined in the authentication key. The permission is assigned by the center server 30.

For example, when the authentication key has the permission to unlock only part of the doors of the vehicle 10, the key ECU 124 transmits an unlock signal, including information that designates the door(s) to be unlocked, to the key unit 12 through the RF radio wave transmitter 122. Thus, as described above, only part of the doors of the vehicle 10 may be unlocked.

For example, when the authentication key has no permission to start the engine 117, the key ECU 124 just needs to be configured not to exchange signals with the lock/unlock and start device 11 even when an LF-band signal from the lock/unlock and start device 11 based on a depressing operation of the start switch has been received by the LF radio wave receiver 121. Thus, it is possible to prohibit start of the engine 117 in accordance with the permission of the authentication key.

The GPS module 13 receives GPS signals that are transmitted from three or more, desirably four or more satellites above the vehicle 10, and measures the location of the vehicle 10. The GPS module 13 is communicably connected to the DCM 14, or the like, through the in-vehicle network, such as a one-to-one communication line and the CAN. The measured location information of the vehicle 10 is input to the DCM 14, or the like.

The DCM 14 is a communication device that bidirectionally carries out communication with the center server 30 through a predetermined communication network. The DCM 14 transmits the current location information of the vehicle 10, which is input from the GPS module 13, to the center server 30 at prescribed timing or in response to a request, or the like, from the center server 30. The DCM 14 transmits various pieces of vehicle information to the center server 30. Examples of the various pieces of vehicle information include information that the doors of the vehicle 10 have been unlocked based on the authentication key or the vehicle 10 has been started based on the authentication key. The various pieces of vehicle information are acquired through the in-vehicle network, such as the CAN, at prescribed timing or in response to a request, or the like, from the center server 30.

Each mobile terminal 20 includes a communication device 21, a communication device 22, a processing device 23, and a touch panel display (hereinafter, simply referred to as display) 24.

The communication device 21 is any device that carries out near-field communication with the vehicle 10 in accordance with the same communication standards as the communication device 123. As described above, the communication device 21 is, for example, a BLE communication module in the case of the present embodiment.

The communication device 22 is any device that carries out communication with the center server 30, the service management servers 40, and the like, through a predetermined communication network. The communication device 22 is, for example, a mobile communication module that conforms to communication standards, such as long term evolution (LTE), 4th generation (4G) and 5th generation (5G).

The processing device 23 executes various control processes in the mobile terminal 20. The functions of the processing device 23 may be implemented by hardware, software, or a combination of hardware and software. The processing device 23 includes, for example, a CPU, a RAM, a ROM, an auxiliary storage device, an RTC, various interfaces for communication, and the like. The processing device 23 includes, for example, a communication processing unit 231, a communication processing unit 232, an authentication key acquisition unit 233, an authentication requesting unit 234, and a lock/unlock requesting unit 235, as functional units that are implemented by executing one or more programs stored in the ROM or the auxiliary storage device on the CPU. The processing device 23 also includes, for example, a storage unit 230 that is implemented as a storage area in the auxiliary storage device. A process of saving (storing) various data in the storage unit 230 is implemented by a predetermined program stored in the ROM or the auxiliary storage device.

The communication processing unit 231 bidirectionally carries out near-field communication with the key unit 12 with the use of the communication device 21, and transmits or receives various signals.

The communication processing unit 232 establishes connection with a predetermined communication network with the use of the communication device 22, and transmits or receives various signals, such as data signals and control signals, with the center server 30, the service management servers 40, and the like.

The authentication key acquisition unit 233, for example, acquires an authentication key from the center server 30 and saves the acquired authentication key in the storage unit 230 in response to a predetermined operation of the user to a predetermined graphical user interface (GUI) that is displayed on the display 24. Hereinafter, description will be made on the assumption that various operations to the mobile terminal 20 are made by operations to GUI that is displayed on the display 24 in synchronization with the operation of the key application.

For example, the authentication key acquisition unit 233 of the mobile terminal 20Aa transmits an authentication key acquisition request to the center server 30 via the communication processing unit 232. Thus, the center server 30 receives the authentication key acquisition request, and, when the center server 30 determines that the authentication key acquisition request is a regular authentication key acquisition request, issues an authentication key. The authentication key acquisition unit 233 acquires the authentication key that is delivered from the center server 30 via the communication processing unit 232.

For example, the authentication key acquisition unit 233 of the mobile terminal 20Ab acquires an authentication key that is delivered from the center server 30 to the mobile terminal 20Ab via the communication processing unit 232 in response to a key sharing request (described later) that is transmitted from the mobile terminal 20Aa to the center server 30.

The authentication key acquisition unit 233 of the mobile terminal 20Ab by itself may transmit an authentication key acquisition request to the center server 30 via the communication processing unit 232. In this case, when the center server 30 has received the authentication key acquisition request from the mobile terminal 20Ab, the center server 30 just needs to make an inquiry to the mobile terminal 20Aa of the owner user about whether to allow delivery of the authentication key.

For example, the authentication key acquisition unit 233 of the mobile terminal 20Ac transmits an authentication key acquisition request to acquire an authentication key to the delivery management server 50. For example, the authentication key acquisition unit 233 of the mobile terminal 20Ad transmits an authentication key acquisition request to acquire an authentication key to the C2C car sharing management server 70. For example, the authentication key acquisition unit 233 of the mobile terminal 20B transmits an authentication key acquisition request to acquire an authentication key to the B2C car sharing management server 80. Thus, each of the delivery management server 50, the C2C car sharing management server 70, and the B2C car sharing management server 80 transmits an authentication key arrangement request to the center server 30 in response to reception of an authentication key acquisition request, and the center server 30 issues an authentication key in response to reception of the authentication key arrangement request.

The authentication key acquisition unit 233 acquires the authentication key that is delivered from the center server 30 via the communication processing unit 232.

The authentication key acquisition unit 233 of each of the mobile terminals 20Ac, 20Ad, 20B may transmit an authentication key acquisition request to the center server 30 through the communication processing unit 232. In this case, the center server 30 may determine whether the authentication key acquisition request is a regular authentication key acquisition request by making an inquiry to a corresponding one of the delivery management server 50, the C2C car sharing management server 70, and the B2C car sharing management server 80.

The authentication requesting unit 234 transmits an authentication request to authenticate the mobile terminal 20 to the key unit 12 of the vehicle 10 via the communication processing unit 231. The mobile terminal 20 serves as a remote operating unit for locking or unlocking the doors of the vehicle 10. For example, when the authentication requesting unit 234 has found a key unit corresponding to an authentication key, specifically, when an advertising packet corresponding to the key unit 12 has been received by the communication processing unit 231, the authentication requesting unit 234 may transmit an authentication request to the key unit 12. For example, the authentication requesting unit 234 may transmit an authentication request to the key unit 12 in response to a predetermined operation of the user.

The lock/unlock requesting unit 235 transmits an unlock request including an authentication key or a lock request including an authentication key to the key unit 12 via the communication processing unit 231 in response to a predetermined operation of the user. Thus, even when an unlock request or a lock request has been transmitted to the key unit 12 before an authentication request is transmitted by the authentication requesting unit 234, the doors of the vehicle 10 may be locked or unlocked based on the authentication process in the key unit 12. For example, the GUI that is an operation screen of the display 24 may contain an unlock button for issuing a request to unlock the vehicle 10 and a lock button for issuing a request to lock the vehicle 10, a lock request may be transmitted with the touch of the lock button, and an unlock request may be transmitted with the touch of the unlock button. A lock request and an unlock request may be transmitted as a result of an operation to a predetermined hardware operating unit provided in the mobile terminal 20.

For example, the functions of the authentication key acquisition unit 233, authentication requesting unit 234, and lock/unlock requesting unit 235 may be configured to be available to the user by launching a predetermined application program that is installed on the ROM, auxiliary storage device, or the like, of the processing device 23. Hereinafter, description will be made on the assumption that the functions of the authentication key acquisition unit 233, authentication requesting unit 234, and lock/unlock requesting unit 235 of the processing device 23 become available to the user by launching the key application installed on the processing device 23 (the auxiliary storage device or the ROM).

The center server 30 includes a communication device 31 and a processing device 32.

The functions of the center server 30 may be implemented by a plurality of servers in a distributed manner. Hereinafter, this also applies to the delivery management server 50, the EC server 60, the C2C car sharing management server 70, and the B2C car sharing management server 80.

The communication device 31 is any device that bidirectionally carries out communication with each of the vehicles 10, the mobile terminals 20, and the service management servers 40 through a predetermined communication network.

The processing device 32 executes various control processes in the center server 30. The functions of the processing device 32 may be implemented by hardware, software, or a combination of hardware and software. The processing device 32 is mainly formed of one or plurality of server computers each including, for example, a CPU, a RAM, a ROM, an auxiliary storage device, an RTC, a predetermined communication interface, and the like. Hereinafter, this also applies to a processing device 52 (described later) of the delivery management server 50, a processing device 62 (described later) of the EC server 60, a processing device 72 (described later) of the C2C car sharing management server 70, and a processing device 82 (described later) of the B2C car sharing management server 80. The processing device 32 includes, for example, a communication processing unit 321, a condition determination unit 322, and an authentication key issuance unit 323 as functional units that are implemented by executing one or more programs saved in the ROM or the auxiliary storage device on the CPU. The processing device 32 also includes, for example, a storage unit 320 that is implemented as a storage area defined in the auxiliary storage device of the corresponding server computer, an external storage device that is connected to the corresponding server computer, or other storage devices. A process of saving (storing) various data in the storage unit 320 is implemented by a program stored in the ROM or the auxiliary storage device. Hereinafter, this also applies to storage units 520, 620, 720, 820 (described later).

The communication processing unit 321 controls the communication device 31, and exchanges various signals, such as control signals and information signals, with each of the vehicles 10, the mobile terminals 20, and the service management servers 40.

The condition determination unit 322 determines whether an authentication key acquisition request is a regular authentication key acquisition request in response to reception of the authentication key acquisition request, received by the communication processing unit 321, from the mobile terminal 20. The condition determination unit 322 also determines whether an authentication key arrangement request is a regular authentication key arrangement request in response to reception of the authentication key arrangement request from any one of the service management servers 40.

When the condition determination unit 322 determines that the authentication key acquisition request is a regular authentication key acquisition request or determines that the authentication key arrangement request is a regular authentication key arrangement request, the authentication key issuance unit 323 (an example of a key information delivery unit) identifies the specifications of an authentication key to be issued, and issues an authentication key corresponding to the identified specifications. For example, the authentication key issuance unit 323 identifies the vehicle 10 intended to be locked or unlocked with an authentication key or identifies the key unit 12, or the like, corresponding to the intended vehicle 10. For example, the authentication key issuance unit 323 also identifies the permission of the authentication key on an effective (available) period of the authentication key and the number of times the authentication key is available. For example, the authentication key issuance unit 323 also identifies the permission of the authentication key for unlocking the vehicle 10 or starting the vehicle 10, such as which door is allowed to be locked or unlocked and whether the vehicle 10 is allowed to be started. For example, the authentication key issuance unit 323 also identifies the permission of the authentication key on temporary key sharing, such as whether the authentication key is allowed to be shared with another one of the mobile terminals 20 through temporary key sharing (described later), a period during which the authentication key is allowed to be shared with another one of the mobile terminals 20, and the number of times the authentication key is allowed to be shared with another one of the mobile terminals 20. Hereinafter, the permission of the authentication key on an available period, the available number of times, and the like, the permission of the authentication key for unlocking the vehicle 10 or starting the vehicle 10, and the permission of the authentication key on temporary key sharing are collectively simply referred to as various types of permission of the authentication key. The authentication key issuance unit 323 delivers the authentication key issued for the intended mobile terminal 20 via the communication processing unit 321.

Details of Components Related to Key Sharing Service

Next, components related to the key sharing service in the authentication key management system 1 will be described with reference to FIG. 3.

Figure 3:
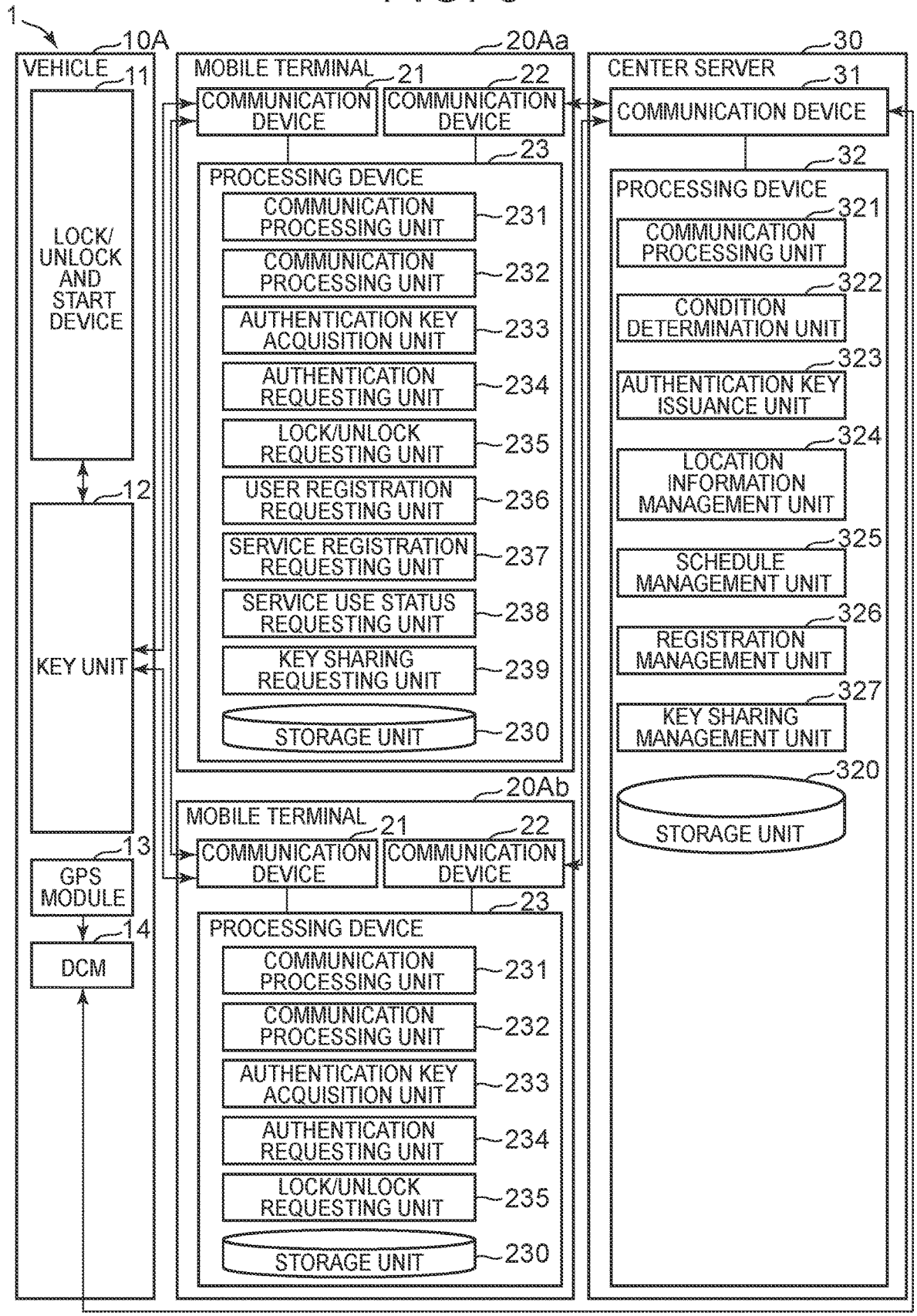
FIG. 3 is a block diagram that mainly shows an example of components related to a key sharing service in the authentication key management system.

FIG. 3 is a block diagram that mainly shows an example of components related to the key sharing service in the authentication key management system 1. Hereinafter, for FIG. 3, components related to the key sharing service in the authentication key management system 1 will be mainly described, and the overlap description of components that overlap with the above-described components related to locking and unlocking of the vehicle 10 and starting of the vehicle 10 is omitted as much as possible. Hereinafter, the same applies to the description of FIG. 4 to FIG. 6.

As described above, the processing device 23 of the mobile terminal 20Aa owned by the owner user of the vehicle 10A includes the communication processing unit 231, the communication processing unit 232, the authentication key acquisition unit 233, the authentication requesting unit 234, and the lock/unlock requesting unit 235. The processing device 23 of the mobile terminal 20Aa further includes a user registration requesting unit 236, a service registration requesting unit 237, a service use status requesting unit 238, and a key sharing requesting unit 239.

In the present embodiment, description will be made on the assumption that the functions of the user registration requesting unit 236, service registration requesting unit 237, service use status requesting unit 238 and key sharing requesting unit 239 of the mobile terminal 20Aa become available to the owner user when the key application is launched and user authentication based on bidirectional communication with the center server 30 is successful. Description will be made on the assumption that the user authentication is performed on the center server 30 based on an ID prescribed for the owner user (hereinafter, referred to as owner user ID) and a password corresponding to the owner user ID.

The user registration requesting unit 236 requests registration of a regular user of the vehicle 10A, who uses various services using the vehicle 10A (the key sharing service, the trunk delivery service, and the C2C car sharing service), to the center server 30 in response to a predetermined operation of the owner user. For example, the user registration requesting unit 236 transmits a user registration request including the owner user ID, the password, and attribute information that identifies a child user to be registered (for example, a name, an age, a relation with the owner user, and the like) to the center server 30 via the communication processing unit 232.

When a notification that registration of the child user has completed (user registration completion notification) has been received from the center server 30 by the communication processing unit 232, the user registration requesting unit 236 saves an ID of the child user (hereinafter, referred to as child user ID) and a password, included in the user registration completion notification, in the storage unit 230. At this time, the user registration requesting unit 236 may transmit the child user ID and the password to the mobile terminal 20Ab owned by the registered child user via the communication processing unit 231 in response to a predetermined operation of the owner user.

The service registration requesting unit 237 requests registration of the regular users of the vehicle 10A with various services using the vehicle 10A to the center server 30 in response to a predetermined operation of the owner user. That is, as described above, the service registration requesting unit 237 requests registration of authentication key arrangement permission of the key sharing management unit 327 and service management servers 40 corresponding to various services, for the regular users of the vehicle 10A to use the various services. For example, the service registration requesting unit 237 transmits the owner user ID, the password, information that identifies the vehicle 10A that is used in various services, information that identifies an intended service, and a service registration request including the ID of the regular user who uses the intended service (the owner user ID or the child user ID) to the center server 30 via the communication processing unit 232. Hereinafter, the owner user ID and the child user ID may be collectively referred to as regular user IDs. Thus, the service registration requesting unit 237 is able to register a child user who uses the key sharing service in the center server 30.

The service registration requesting unit 237 receives a notification that registration with a service based on the service registration request has completed from at least one of the center server 30 and the service management servers 40 with the use of the communication processing unit 232. The service registration requesting unit 237 causes the display 24 to display the fact that registration of the regular user of the vehicle 10A with a specific service based on a predetermined operation of the owner user has completed. Thus, the owner user is informed of the fact that registration of the regular user with the specific service has completed.

The service use status requesting unit 238 requests information related to the use statuses of various services, including the key sharing service, with which the regular user of the vehicle 10A has registered in association with the owner user ID (service use status information), to the center server 30 in response to a predetermined operation of the owner user. For example, the service use status requesting unit 238 transmits a service use status request including the owner user ID and the password to the center server 30 via the communication processing unit 232. When the service use status information has been received from the center server 30 by the communication processing unit 232, the service use status requesting unit 238 displays the service use status information on the display 24. Thus, the owner user is able to monistically see information related to the use statuses of various services with which the regular users register in the center server 30 in association with the owner user ID.

The key sharing requesting unit 239 requests delivery of an authentication key for locking or unlocking the vehicle 10A or starting the vehicle 10A to the child user registered with the key sharing service, to the center server 30 in response to a predetermined operation of the owner user. For example, the key sharing requesting unit 239 transmits a key sharing request to the center server 30 via the communication processing unit 232. The key sharing request includes the owner user ID, the password, information related to the vehicle 10A to be locked or unlocked with the use of the authentication key, information related to the intended child user to deliver (share) the authentication key to (for example, the child user ID). At this time, the key sharing request may include use period information related to an available period of the authentication key to be delivered (for example, a use start date and time, a use end date and time, or the like), which is set by a predetermined operation of the owner user. The key sharing request may also include permission information related to various types of permission of authentication keys, which may be designated in response to a predetermined operation of the owner user. The various types of permission of the authentication keys include the permission of an authentication key on an available period, the available number of times, or the like, the permission of an authentication key for unlocking the vehicle or starting the vehicle, the permission of an authentication key on temporary key sharing (described later), and the like. Thus, as will be described later, when the owner user sets appropriate permission information in the case where an authentication key available at the same time is shared between the plurality of mobile terminals 20, usage of the vehicle 10A by a user other than the owner user is able to be limited. For this reason, it is possible to improve the security of the vehicle 10A.

The key sharing requesting unit 239 may request delivery of authentication keys of which available periods conflict with each other to the center server 30 in response to a predetermined operation of the owner user while the mobile terminals 20 (that is, each of which is at least one of the mobile terminals 20Aa, 20Ab) of the plurality of regular users of the vehicle 10A are set for delivery destinations. That is, in the key sharing request, a plurality of regular users to which authentication keys are delivered may be designated, and the plurality of regular users may include the owner user. In the key sharing request, available periods of authentication keys for a plurality of regular users to be designated may conflict with each other. Thus, an authentication key of the vehicle 10A available at the same time may be shared between the plurality of regular users. For this reason, for example, when two or more persons get on the vehicle 10A and go on a trip or go camping, each of the passengers is allowed to, for example, lock or unlock the vehicle 10A without lending or borrowing the mobile terminal 20 in which the authentication key is saved, so it is possible to improve convenience of the users.

The key sharing requesting unit 239 may share the already delivered authentication key with another one of the mobile terminals 20 (that is, the mobile terminal 20 onto which the key application is installed) in response to a predetermined operation of the owner user (hereinafter, a manner of sharing the authentication key is referred to as temporary key sharing). At this time, another one of the mobile terminals 20 may be the mobile terminal 20Ab of the child user or may be the mobile terminal 20 of a user other than the child user, that is, a user who temporarily uses the vehicle 10A.

For example, the key sharing requesting unit 239 transmits the authentication key (specifically, a copy of the authentication key) to another one of the mobile terminals 20 through the communication processing unit 231. Thus, even when two or more persons suddenly decide to get on the vehicle 10A to go on a trip, or the like, the owner user of the vehicle 10A is allowed to share the authentication key with another user. In addition, the mobile terminal 20Aa is directly able to share the authentication key available to another one of the mobile terminals 20 at the same time. For this reason, for example, even when the mobile terminal 20Aa is located in a place of a poor communication condition in a wireless mobile communication network or outside a communication range, the owner user of the vehicle 10A is allowed to share the authentication key with another user.

At this time, the key sharing requesting unit 239 may transmit an authentication key to another one of the mobile terminals 20 through the communication processing unit 231, and the authentication key has limited permission of the authentication key on an available period or the available number of times or limited permission for unlocking the vehicle 10A or starting the vehicle 10A. Each time of permission is set based on a predetermined operation of the owner user or defined in advance. Specifically, for example, an authentication key with permission that limits an available period to 30 minutes, or the like, or that limits the available number of times to once, or the like, or an authentication key with permission that limits doors to be locked or unlocked to doors for getting on or off the vehicle 10A only or that prohibits the vehicle 10A from starting may be transmitted to another one of the mobile terminals 20. Hereinafter, this also applies to the case of temporary key sharing that is performed via the center server 30. Thus, it is possible to improve the security of the vehicle 10A in temporary key sharing.

When temporary key sharing is performed, the key sharing requesting unit 239 may cause the center server 30 to deliver an authentication key to another one of the mobile terminals 20 as in the case of normal key sharing. At this time, the key sharing requesting unit 239 may cause the center server 30 to deliver the authentication key of the vehicle 10A to another one of the mobile terminals 20 by transmitting a temporary key sharing request, including information that identifies the delivered authentication key (for example, an issued ID embedded in the authentication key, or the like) and information that designates another one of the mobile terminals 20 as a delivery destination, to the center server 30 through the communication processing unit 232.

For example, when another one of the mobile terminals 20 is the mobile terminal 20Ab of the child user, the key sharing requesting unit 239 may transmit a temporary key sharing request including the child user ID to the center server 30 through the communication processing unit 232.

For example, the key sharing requesting unit 239 also acquires predetermined identification information (for example, a QR code (registered trademark) corresponding to the user of another one of the mobile terminals 20, who is registered in the center server 30 as an installed user of the key application) from the another one of the mobile terminals 20 through the communication processing unit 231, or the like. The key sharing requesting unit 239 may transmit a temporary key sharing request that designates another one of the mobile terminals 20, which is identified based on the identification information, as a delivery destination to the center server 30.

The mobile terminal 20Aa may acquire the identification information with another method. For example, the mobile terminal 20Aa may acquire identification information corresponding to the user of another one of the mobile terminals 20 by recognizing identification information that is displayed on the display 24 of the another one of the mobile terminals 20 with the use of an onboard camera function. For example, the mobile terminal 20Aa may also acquire identification information transmitted from the user of another one of the mobile terminals 20 to a mail address or SNS account of the owner user.

For example, the key sharing requesting unit 239 also transmits a candidate terminal information request to the center server 30 through the communication processing unit 232 in response to a predetermined operation of the owner user. The candidate terminal information request is to request candidate terminal information related to a candidate terminal that is a candidate of another one of the mobile terminals 20 and that is located around a current location of the mobile terminal 20Aa. When the candidate terminal information has been received from the center server 30 by the communication processing unit 232, the key sharing requesting unit 239 also causes the display 24 to display the candidate terminal information. At this time, the candidate terminal information that is returned from the center server 30 may include information that identifies a candidate terminal on which a specific operation or action is being performed among the candidate terminals. Thus, the owner user of the vehicle 10A is allowed to identify another one of the mobile terminals 20, intended for key sharing, from among the candidate terminals that are displayed on the display 24 of the mobile terminal 20Aa as the user of the another one of the mobile terminals 20 performs a specific operation or action on the another one of the mobile terminals 20. The key sharing requesting unit 239 may transmit a temporary key sharing request that designates the another one of the mobile terminals 20, identified from among the candidate terminals, as a delivery destination to the center server 30 in response to a predetermined operation of the owner user.

The key sharing requesting unit 239 may also transmit link information based on a uniform resource locator (URL) scheme for launching the key application and causing another one of the mobile terminals 20 to acquire an authentication key from the center server 30 (hereinafter, simply referred to as link information) to a mail address or SNS account of the user of the another one of the mobile terminals 20 through the communication processing unit 232 in response to a predetermined operation of the owner user. At this time, the key sharing requesting unit 239 transmits a temporary key sharing request that designates the acquired authentication key to the center server 30 through the communication processing unit 232 in response to a predetermined operation of the owner user, and acquires link information that is returned from the center server 30 in response to the temporary key sharing request. Thus, the key sharing requesting unit 239 is able to deliver an authentication key from the center server 30 to another one of the mobile terminals 20.

Temporary key sharing may be configured to be executable from the mobile terminal 20Ab of the child user, to which the authentication key has been already delivered. That is, the functions of the key sharing requesting unit 239, related to temporary key sharing, may be included in the functions of the key application that is installed onto the processing device 23 of the mobile terminal 20Ab of the child user. Thus, even in the case where two or more persons except the owner user get on the vehicle 10A, it is not necessary to lend or borrow the mobile terminal 20Ab of the child user who has already acquired the authentication key among the two or more persons, so it is possible to further improve the convenience of the child user of the vehicle 10A. Hereinafter, description will be made on the assumption that temporary key sharing is available from the mobile terminal 20Ab of the child user.

As described above, the processing device 32 of the center server 30 includes the communication processing unit 321, the condition determination unit 322, the authentication key issuance unit 323, and the storage unit 320. The processing device 32 (an example of an information processing device) of the center server 30 includes, for example, a location information management unit 324, a schedule management unit 325, a registration management unit 326, and the key sharing management unit 327 as functional units that are implemented by executing one or more programs stored in the ROM or the auxiliary storage device on the CPU.

When the communication processing unit 321 has received an authentication key acquisition request from any one of the mobile terminals 20Aa, 20Ab, the condition determination unit 322 performs authentication based on the regular user ID and the password, included in the authentication key acquisition request. For example, the condition determination unit 322 compares the regular user ID and password registered in the storage unit 320 with the regular user ID and password included in the authentication key acquisition request. When the registered regular user ID and password match the regular user ID and password included in the authentication key acquisition request, the condition determination unit 322 determines that authentication is successful, that is, the authentication key acquisition request is a regular authentication key acquisition request.

The condition determination unit 322 also determines whether an authentication key arrangement request that is transferred from the key sharing management unit 327 (described later) is a regular authentication key arrangement request. For example, when authentication is successful based on authentication information (for example, the ID and the password) included in the authentication key arrangement request from the key sharing management unit 327, the condition determination unit 322 may determine that the authentication key arrangement request is a regular authentication key arrangement request.

When the condition determination unit 322 determines that the authentication key acquisition request is a regular authentication key acquisition request or the authentication key arrangement request is a regular authentication key arrangement request, the authentication key issuance unit 323 issues an authentication key, and delivers the authentication key to the intended mobile terminal 20 through the communication processing unit 321.

The location information management unit 324 acquires location information from the vehicle 10A via the communication processing unit 321, and keeps track of a travel status of the vehicle 10A by monitoring the location information of the vehicle 10A in real time. Thus, for example, the location information management unit 324 is able to inform the owner user of the location information of the vehicle 10A lent to the child user via the communication processing unit 321. For example, the location information management unit 324 is able to inform the mobile terminal 20Ab of the child user of information, such as whether the vehicle 10A scheduled to be lent to the child user is heading toward a designated location (home, or the like) and how long does it take to get to the designated location, via the communication processing unit 321.

The schedule management unit 325 manages the use of the vehicle 10A in various services. For example, the schedule management unit 325 periodically acquires a use schedule of the vehicle 10A in the key sharing service, specifically, information related to an available date and time of the authentication key that is delivered by the key sharing service, from the key sharing management unit 327. The schedule management unit 325 also acquires a use schedule of the vehicle 10A in each of the trunk delivery service and the C2C car sharing service from the delivery management server 50 and the C2C car sharing management server 70 via the communication processing unit 321. The schedule management unit 325 generates information related to a use schedule of the vehicle 10A over a plurality of services (vehicle use schedule information) based on the acquired use schedule of the vehicle 10A in the various services, and updates old vehicle use schedule information saved in the storage unit 320.

The registration management unit 326 registers the regular user (child user) who uses various services in response to a user registration request that is received from the mobile terminal 20Aa of the owner user by the communication processing unit 321. For example, the registration management unit 326 compares the owner user ID and password included in the user registration request from the mobile terminal 20Aa with the owner user ID and password saved in the storage unit 320. When the owner user ID and password included in the user registration request match the saved owner user ID and password, the registration management unit 326 determines that the user registration request is a regular user registration request, that is, authentication is successful. The registration management unit 326 registers the child user ID included in the regular user registration request in a user and service registration information database (DB) in the storage unit 320 as a regular user who is allowed to use various services.

The registration management unit 326 (an example of a registration unit) registers the regular user of the vehicle 10A with various services in response to a service registration request that is received from the mobile terminal 20Aa of the owner user by the communication processing unit 321. That is, the registration management unit 326 registers authentication key arrangement permission of the key sharing management unit 327 and service management servers 40 corresponding to various services in response to the service registration request. The authentication key arrangement permission is permission for the user of the vehicle 10A to use the various services. For example, the registration management unit 326 determines whether the service registration request is a regular service registration request by executing an authentication process similar to the above-described process based on the owner user ID and password included in the service registration request from the mobile terminal 20Aa. When the service registration request is a regular service registration request, the registration management unit 326 also determines whether the regular user ID included in the service registration request has been already registered in the user and service registration information DB. When the regular user ID included in the service registration request has been already registered in the user and service registration information DB, the registration management unit 326 registers an intended service, which is identified by the service registration request, in the user and service registration information DB in the storage unit 320 as a service available to the regular user corresponding to the regular user ID.

Specifically, the registration management unit 326 constructs the user and service registration information DB that associates service unique information, vehicle unique information, the regular user ID, and service link information with the owner user ID. The service unique information identifies an intended service. The vehicle unique information identifies the vehicle 10A. The regular user ID identifies the regular user who uses a service. The service link information associates the vehicle unique information and the regular user ID, corresponding to the vehicle 10A, with the intended service.

The service unique information is, for example, a service ID that is defined for each service. Specifically, for example, when there is a plurality of business operators that provide the C2C car sharing service, a service ID unique to each of the business providers is defined. For example, when the same business operator provides a plurality of C2C car sharing services, an ID unique to each of the services that the same business operator provides is defined. When the trunk delivery service is provided by a combination between a plurality of delivery service providers and a plurality of EC business operators, a unique service ID may be defined for each combination of a delivery service provider and an EC business operator, or an intended service may be identified by a combination of a unique service ID that is defined for each of a plurality of delivery service providers and a unique service ID that is defined for each of the plurality of EC business operators.

The vehicle unique information may be any information as long as the vehicle unique information is able to identify the vehicle 10A to be locked or unlocked or to be started with an authentication key. The vehicle unique information may be, for example, identification information, such as a vehicle ID and a VIN, that is defined for each vehicle 10A. The vehicle unique information may be, for example, identification information, such as a key unit ID, that is defined for each in-vehicle device, such as the key unit 12, that is related to locking or unlocking of doors or starting of the vehicle 10A based on an authentication key and that is mounted on the vehicle 10A. Hereinafter, description will be made on the assumption that the vehicle unique information is a key unit ID.

The service link information is information that is required to cause the authentication key issuance unit 323 to issue an authentication key and deliver the authentication key to the intended mobile terminal 20 as any one of the key sharing management unit 327, the delivery management server 50 and EC server 60, and the C2C car sharing management server 70 that respectively manage various services transmits an authentication key arrangement request. That is, the authentication key issuance unit 323 is able to identify the vehicle 10A to be locked or unlocked or to be started with an authentication key and issue an appropriate authentication key by receiving an authentication key arrangement request including service link information from any one of the key sharing management unit 327, the delivery management server 50 and EC server 60, and the C2C car sharing management server 70.

The service link information may be any information as long as the service link information is able to associate an intended service with the vehicle 10A and a user who uses the service in the center server 30. Examples of the service link information may include a login ID of a regular user on each of user-oriented websites for various services corresponding to the key sharing management unit 327, the delivery management server 50, the EC server 60, and the C2C car sharing management server 70 (hereinafter, referred to as service login ID for the sake of convenience). In this case, the service registration requesting unit 237 of the mobile terminal 20Aa transmits a service registration request including the service login IDs of a regular user to be registered, corresponding to various services, to the center server 30 via the communication processing unit 232.

When a regular user to be registered has not acquired service login IDs corresponding to various services yet, the processing device 23 of the mobile terminal 20Aa may launch a predetermined browser and cause the regular user to acquire service login IDs of the websites for the various services. Thus, when a user (a regular user of the vehicle 10A) logs onto a website at the time of requesting an intended service, the delivery management server 50 or the C2C car sharing management server 70 is able to find a service login ID corresponding to service link information and easily arrange for an authentication key related to provision of the service. Hereinafter, description will be made on the assumption that the service link information related to the trunk delivery service and the C2C car sharing service is the above-described service login ID.

In the case of a regular user who regularly uses the plurality of vehicles 10A, the center server 30 is able to identify the regular user but is not able to identify the vehicle 10A with only the service login ID. For this reason, the service link information includes not only a service login ID but also information for indirectly identifying the vehicle 10A (for example, information obtained by encrypting vehicle unique information in a predetermined manner, or the like).

When the registration management unit 326 has completed registration with various services, the registration management unit 326 provides a notification of the completion to the mobile terminal 20Aa or the mobile terminal 20Ab, corresponding to a regular user to be registered, via the communication processing unit 321. When the registration management unit 326 has completed registration with various services, the registration management unit 326 also provides a service registration completion notification including service link information to any one of the key sharing management unit 327 and the service management servers 40, which manages operations of the registered service.

A notification of completion of registration with various services to the mobile terminal 20Aa or the mobile terminal 20Ab may be transmitted from any one of the service management servers 40, which has received a service registration completion notification.

When the communication processing unit 321 has received a service use status request from the mobile terminal 20Aa, the registration management unit 326 generates service use status information based on the user and service registration information DB of the storage unit 320, the vehicle use schedule information that is managed by the schedule management unit 325, and the like, and delivers the service use status information to the mobile terminal 20Aa via the communication processing unit 321.

The key sharing management unit 327 manages operations of the key sharing service.

For example, the key sharing management unit 327 arranges for an authentication key to the mobile terminal 20Aa or mobile terminal 20Ab corresponding to a regular user ID that is designated by a key sharing request in response to the key sharing request that is received from the mobile terminal 20Aa of the owner user by the communication processing unit 321. Specifically, the key sharing management unit 327 compares the owner user ID and password included in the key sharing request with the owner user ID and password saved in the storage unit 320. When the owner user ID and password included in the key sharing request match the saved owner user ID and password, the key sharing management unit 327 determines that the key sharing request is a regular key sharing request. The key sharing management unit 327 also makes an inquiry to the schedule management unit 325, and determines whether there is inconsistency between use period information included in the key sharing request and the latest vehicle use schedule information, that is, whether there is a date and time conflict in relation to usage of the vehicle 10A among a plurality of services, and a plurality of regular users. When there is no date and time conflict, the key sharing management unit 327 transfers an authentication key arrangement request to the authentication key issuance unit 323. The authentication key arrangement request includes information related to a regular user and the vehicle 10A, and permission information, which are identified from information included in the key sharing request. The regular user corresponds to the mobile terminal 20Aa or the mobile terminal 20Ab, which is a delivery destination of an authentication key. The vehicle 10A is to be locked or unlocked or to be started with the authentication key. The permission information includes information about an available period of the intended mobile terminal 20Aa or mobile terminal 20Ab, the number of times the intended mobile terminal 20Aa or mobile terminal 20Ab is available, unlockable doors of the intended mobile terminal 20Aa or mobile terminal 20Ab, whether the intended mobile terminal 20Aa or mobile terminal 20Ab is allowed to start the vehicle 10A, and the like. Thus, the authentication key issuance unit 323 is able to identify the regular user ID corresponding to the mobile terminal 20Aa or mobile terminal 20Ab, which is a delivery destination of an authentication key, and the vehicle 10A to be locked or unlocked or to be started with an authentication key, and issue an appropriate authentication key.

The key sharing management unit 327 also checks, for example, attribute information (for example, an age, whether the user has a driver's license, and the like) of the user of the mobile terminal 20Aa or mobile terminal 20Ab, which is a delivery destination of an authentication key and which is designated by the key sharing request. The attribute information is stored in the storage unit 320. When the user of the mobile terminal 20Aa or mobile terminal 20Ab, which is a delivery destination of an authentication key (the regular user of the vehicle 10A), is a user that is determined not to be able to drive the vehicle 10A, the key sharing management unit 327 issues an authentication key, with permission not allowing the user to start the vehicle 10A, to the mobile terminal 20 of the user. Examples of the user who is not allowed to drive the vehicle 10A include a user who has not reached a minimum driving age for a driver's license, and a user who has no driver's license. Specifically, the key sharing management unit 327 transfers an authentication key arrangement request to the authentication key issuance unit 323, and the authentication key arrangement request includes permission information that corresponds to the mobile terminal 20Aa or mobile terminal 20Ab, corresponding to the user who is determined to be not allowed to drive the vehicle 10A, and that includes an instruction to prohibit the vehicle 10A from starting. Thus, since the authentication key issuance unit 323 is able to deliver an authentication key with permission to prohibit the vehicle 10A from starting, to the mobile terminal 20Aa or mobile terminal 20Ab of the user who is not allowed to drive the vehicle 10A, it is possible to improve the security of the vehicle 10A in the key sharing service.

For example, the key sharing management unit 327 delivers the authentication key of the vehicle 10A to another one of the mobile terminals 20, designated by the temporary key sharing request, based on the temporary key sharing request that is received from the mobile terminal 20Aa of the owner user by the communication processing unit 321. Specifically, the key sharing management unit 327 identifies an ID of an installed user (hereinafter, referred to as installed user ID) corresponding to another one of the mobile terminals 20, which is a delivery destination, based on an installed user information DB of the key application, stored in the storage unit 320. The key sharing management unit 327 transfers the authentication key arrangement request including the identified installed user ID and information corresponding to the authentication key designated by the temporary key sharing request (for example, an issued ID of the authentication key included in the temporary key sharing request, or the like) to the authentication key issuance unit 323. Thus, the authentication key issuance unit 323 is able to identify another one of the mobile terminals 20, which is a delivery destination, based on the installed user ID, the issued ID of the authentication key, and the like, and deliver the authentication key to the another one of the mobile terminals 20 via the communication processing unit 321.

The functions of the key sharing management unit 327 may be transferred to a server outside the center server 30 (key sharing management server), as well as the other services using the vehicle 10A. The key sharing management server may be included in the service management servers 40.

As described above, the mobile terminal 20Ab owned by the child user includes the communication processing unit 231, the communication processing unit 232, the authentication key acquisition unit 233, the authentication requesting unit 234, the lock/unlock requesting unit 235, and the storage unit 230.

In the present embodiment, description will be made on the assumption that the function of the authentication key acquisition unit 233 of the mobile terminal 20Ab becomes available to the child user as the key application is launched and user authentication based on bidirectional communication with the center server 30 is successful. Description will be made on the assumption that the user authentication is performed on the center server 30 based on the child user ID and the password. Description will be made on the assumption that the functions of the authentication requesting unit 234, lock/unlock requesting unit 235, and the like, of the mobile terminal 20Ab become available to the child user as the key application is launched.

As described above, the authentication key acquisition unit 233 acquires an authentication key that is delivered from the center server 30 in response to a key sharing request that is transmitted from the mobile terminal 20Aa to the center server 30 via the communication processing unit 232. Thus, the mobile terminal 20Ab is able to lock or unlock the doors of the vehicle 10A and start the vehicle 10A based on the functions of the communication processing unit 231, authentication requesting unit 234 and lock/unlock requesting unit 235. That is, with the key sharing service, the child user who owns the mobile terminal 20Ab is allowed to directly use the vehicle 10A, for example, lock or unlock the vehicle 10A or drive the vehicle 10, with the use of the mobile terminal 20Ab without handing over a key to or from the owner user. Similarly, the owner user is allowed to lend the vehicle 10A to the child user without handing over a key to or from the child user. For this reason, it is possible to improve convenience in lending or borrowing the vehicle 10A between the owner user and child user of the vehicle 10A with the key sharing service in the authentication key management system 1.

As described above, the authentication key acquisition unit 233 acquires an authentication key that is delivered from the center server 30 in response to a temporary key sharing request that is transmitted from the mobile terminal 20Aa to the center server 30 via the communication processing unit 232. This also applies to the case where an authentication key is delivered to the mobile terminal 20 other than the mobile terminal 20Ab of the child user in response to a temporary key sharing request. Thus, the other mobile terminals 20 including the mobile terminal 20Ab are able to lock or unlock the doors of the vehicle 10A or start the vehicle 10A based on the functions of the communication processing unit 231, authentication requesting unit 234 and lock/unlock requesting unit 235. That is, for example, when two or more persons including another regular user get on the vehicle 10A and go out, and even when the child user who owns the mobile terminal 20Ab has not acquired an authentication key in advance, the child user is not required to borrow the mobile terminal 20Aa or mobile terminal 20Ab to which the authentication key has been delivered, and is allowed to directly use the vehicle 10A, for example, lock or unlock the vehicle 10A or drive the vehicle 10A, with the use of the mobile terminal 20Ab. Similarly, even when the owner user has not made the mobile terminal 20Ab of the child user acquire an authentication key in advance, the owner user does not need to lend the own mobile terminal 20Aa to the child user. For this reason, it is possible to improve the convenience of users in the case where two or more persons including a regular user of the vehicle 10A get on the vehicle 10A and use the vehicle 10A with temporary key sharing in the authentication key management system 1.

Details of Components Related to Trunk Delivery Service

Next, components related to the trunk delivery service in the authentication key management system 1 will be described with reference to FIG. 4.

Figure 4:
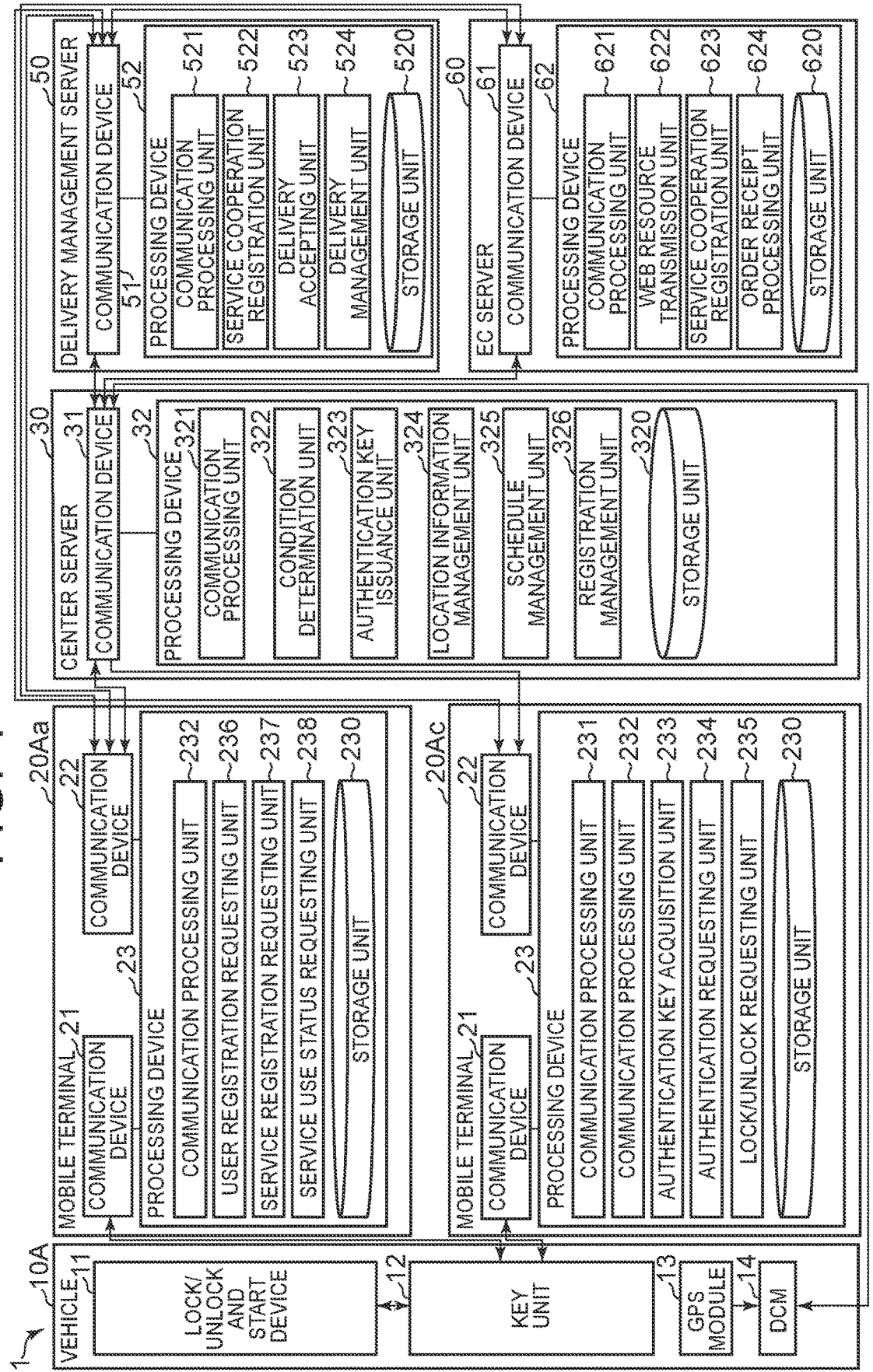
FIG. 4 is a block diagram that mainly shows an example of components related to a trunk delivery service in the authentication key management system.

FIG. 4 is a block diagram that mainly shows an example of components related to the trunk delivery service in the authentication key management system 1. Hereinafter, for FIG. 4, components related to the trunk delivery service in the authentication key management system 1 will be mainly described, and the overlap description of components that overlap with the components related to the above-described key sharing service is omitted as much as possible.

As described above, the processing device 23 of the mobile terminal 20Aa owned by the owner user of the vehicle 10A includes the communication processing unit 232, the user registration requesting unit 236, the service registration requesting unit 237, and the service use status requesting unit 238.

As described above, the user registration requesting unit 236 requests registration of the regular user (child user) of the vehicle 10A, who uses various services including the trunk delivery service, to the center server 30 in response to a predetermined operation of the owner user.

As described above, the service registration requesting unit 237 requests registration of each registered regular user (the owner user or the child user) with various services including the trunk delivery service to the center server 30 in response to a predetermined operation of the owner user.

For example, the service registration requesting unit 237 transmits a service registration request for using the trunk delivery service to the center server 30. The service registration request includes a service login ID of a website for users who use the service of the delivery management server 50 (hereinafter, referred to as delivery site) and a service login ID of an EC site as service link information. The service login IDs correspond to the regular user of the vehicle 10A, who is to be registered.

As described above, the service use status requesting unit 238 requests information related to the use statuses of various services, including the trunk delivery service, by the regular users of the vehicle 10A, who have been registered in association with the owner user ID (service use status information), to the center server 30 in response to a predetermined operation of the owner user.

The delivery management server 50 includes a communication device 51 and the processing device 52.

The communication device 51 is any device that bidirectionally carries out communication with each of the mobile terminals 20, the center server 30, and the EC server 60 through a predetermined communication network.

The processing device 52 includes, for example, a communication processing unit 521, a service cooperation registration unit 522, a delivery accepting unit 523, and a delivery management unit 524 as functional units that are implemented by executing one or more programs stored in the ROM or the auxiliary storage device on the CPU. The processing device 52 also includes the storage unit 520 that is implemented as a storage area, such as the auxiliary storage device of the server computer.

The communication processing unit 521 controls the communication device 51, and exchanges various signals, such as control signals and information signals, with each of the mobile terminals 20, the center server 30, and the EC server 60.

The service cooperation registration unit 522 registers information for cooperation between the center server 30 and the delivery management server 50, related to usage of the trunk delivery service by the regular users of the vehicle 10A, in response to a service registration completion notification that is received from the center server 30 by the communication processing unit 521.

For example, the service cooperation registration unit 522 adds a flag to a service login ID (service link information) included in a service registration completion notification in a user management DB for managing users on the delivery site constructed in the storage unit 520. The flag indicates that the user corresponding to the service login ID is a user of the trunk delivery service. At the same time, the service cooperation registration unit 522 registers the service login ID included in the service registration completion notification in the user management DB of the storage unit 520 in association with a service login ID of the website corresponding to the EC server 60 (that is, EC site). The service login ID of the EC site is included in the service registration completion notification. Thus, when an order including a service login ID has been received from the EC server 60 by the communication processing unit 521, the delivery management server 50 is able to identify the corresponding service login ID of the delivery site. The delivery management server 50 is able to cause the center server 30 to deliver an authentication key to the mobile terminal 20Ac of a delivery person, as will be described later, by transmitting an authentication key arrangement request including the identified service login ID to the center server 30.

The delivery accepting unit 523 receives information related to a request to deliver a package (delivery request information), including the service login ID of the EC site, from the EC server 60 via the communication processing unit 521. The service login ID corresponds to an orderer of a product on the EC site. The delivery request information that is received from the EC server 60 includes not only basic information, such as a name, address and telephone number of an orderer of a delivery address but also information related to a designated delivery address (delivery address information), information related to a designated delivery date and time (delivery date and time information), and the like.

The delivery management unit 524 manages operations of processes from receipt to delivery related to a delivery request received by the delivery accepting unit 523.

For example, as the delivery management unit 524 receives a notification that a package has arrived at a sales office that is in charge of a parking location of the vehicle 10A designated by the delivery address information of a delivery request, the delivery management unit 524 determines a date and time of departure for delivery of the package, a delivery person in charge, and the like, in accordance with the designated delivery time period.

Subsequently, the delivery management unit 524 makes an inquiry about the location information of the vehicle 10A to the center server 30 via the communication processing unit 521 before departure of the package (for example, 10 minutes before scheduled departure time). At this time, the inquiry includes a service login ID (that is, service link information) of the regular user of the vehicle 10A on the delivery site. The regular user of the vehicle 10A is a user of the trunk delivery service. This also applies to an inquiry about location information (described later). The delivery management unit 524 acquires the current location information of the vehicle 10A from the center server 30 via the communication processing unit 521, and determines whether delivery is possible based on matching with the designated parking location, a relationship with an area in charge, and the like.

Subsequently, when the delivery management unit 524 determines that the package is deliverable, the delivery management unit 524 transmits a notification that the package is deliverable to the trunk of the vehicle 10A (deliverable notification), to the mobile terminal 20Ac of a delivery person via the communication processing unit 521.

Subsequently, as the communication processing unit 521 receives an authentication key acquisition request from the mobile terminal 20Ac that has received the deliverable notification, the delivery management unit 524 determines whether the authentication key acquisition request is a regular authentication key acquisition request. Specifically, the delivery management unit 524 may carry out the determination by comparing information related to a package to be delivered (hereinafter, delivery item information for the sake of convenience) with various pieces of information related to the package, registered in the storage unit 520. The delivery item information includes, for example, a delivery person, a delivery address (for example, a name or legal name of a recipient, or the like), the type of the package, a delivery time period, and a delivery place, which may be included in the authentication key acquisition request, As the delivery management unit 524 determines that the authentication key acquisition request is a regular authentication key acquisition request, the delivery management unit 524 transmits an authentication key arrangement request to the center server 30 via the communication processing unit 521. At this time, the authentication key arrangement request includes information for identifying the mobile terminal 20Ac of the delivery person. The information for identifying a delivery person may be, for example, an authentication ID for a delivery person to get user authentication in the center server 30 in order to use the functions of the key application, corresponding to the authentication key acquisition unit 233, and the like, of the mobile terminal 20Ac (hereinafter, referred to as delivery person ID for the sake of convenience). Thus, the mobile terminal 20Ac of the delivery person is able to acquire an authentication key from the center server 30.

Subsequently, as the delivery management unit 524 receives an inquiry about the current location information of the vehicle 10A from the mobile terminal 20Ac of the delivery person who has left for delivery from a sales office via the communication processing unit 521, the delivery management unit 524 makes an inquiry about the current location information of the vehicle 10A to the center server 30. The delivery management unit 524 acquires the current location information of the vehicle 10A from the center server 30 via the communication processing unit 521, and transmits (forwards) the current location information of the vehicle 10A to the mobile terminal 20Ac of the delivery person. Thus, the on-the-road delivery person is allowed to compare the current location information of the vehicle 10A with the information related to the parking location of the vehicle 10A, designated by the delivery address information, and determine whether to deliver the package or bring back the package.

Lastly, as the delivery management unit 524 receives a delivery end notification that is received from the mobile terminal 20Ac of the delivery person who has finished delivery of the package via the communication processing unit 521, the delivery management unit 524 basically ends management of operations related to the trunk delivery service for the package. At this time, the delivery management unit 524 may provide a notification of end of delivery to the regular user of the vehicle 10A, who is a client (a purchaser of a product on the EC site) through an electric mail or a predetermined application that runs in cooperation with the delivery site and that is installed onto the mobile terminal 20Aa or the mobile terminal 20Ab.

As described above, when a door (trunk lid, or the like) for accessing the trunk of the vehicle 10A is unlocked and then locked, the DCM 14 of the vehicle 10A may determine that the delivery person has finished delivery, and may provide a notification of end of delivery to the center server 30. Thus, when the center server 30 has received the notification, the center server 30 is allowed to transmit a delivery end notification to the delivery management server 50. That is, the delivery end notification may be transmitted from the center server 30 to the delivery management server 50.

The EC server 60 includes a communication device 61 and the processing device 62.

The communication device 61 is any device that bidirectionally carries out communication with each of the mobile terminals 20, the center server 30, and the delivery management server 50 through a predetermined communication network.

The processing device 62 includes, for example, a communication processing unit 621, a web resource transmission unit 622, a service cooperation registration unit 623, and an order receipt processing unit 624 as functional units that are implemented by executing one or more programs stored in the ROM or the auxiliary storage device on the CPU. The processing device 62 also includes the storage unit 620 that is implemented as a storage area, such as the auxiliary storage device of the server computer.

The communication processing unit 621 controls the communication device 61, and exchanges various signals, such as control signals and information signals, with each of the mobile terminals 20, the center server 30, and the delivery management server 50.

The web resource transmission unit 622 transmits resources to a browser of any one of terminals in a predetermined manner based on various pieces of information. The resources correspond to webpages to be displayed on a browser of the any one of the terminals of users who browse the EC site. The various pieces of information are resources of the EC site, and are saved in the storage unit 620. The terminals of the users include the mobile terminals 20Aa, 20Ab. The webpages that may be displayed on the EC site include a top page of the EC site, webpages corresponding to individual products that are carried on the EC site, an order input page that a user inputs various pieces of information at the time of ordering individual products, and the like. For example, the web resource transmission unit 622 transmits hypertext markup language (HTML) documents corresponding to the webpages and information under the HTML documents, such as images and moving images, to be displayed on the webpages, in parallel with each other.

The service cooperation registration unit 623 registers information for cooperation between the center server 30 and the EC server 60, related to usage of the trunk delivery service by the regular users of the vehicle 10A, in response to a service registration completion notification that is received from the center server 30 by the communication processing unit 621. For example, the service cooperation registration unit 623 adds a flag to a service login ID included in the service registration completion notification in the user management DB for managing users on the EC site constructed in the storage unit 620. The flag indicates that the user corresponding to the service login ID is a user of the trunk delivery service. At the same time, the service cooperation registration unit 623 registers the service login ID included in the service registration completion notification in the user management DB in association with a service login ID of the website (that is, delivery site) corresponding to the delivery management server 50. The service login ID of the delivery site is included in the service registration completion notification. Thus, for example, when the communication processing unit 621 has received an inquiry, or the like, about an ordered product, including the service login ID of the delivery site, from the delivery management server 50, the EC server 60 is able to identify the corresponding service login ID of the EC site.

The order receipt processing unit 624 receives an order of a product from a user based on various input operations corresponding to the order of the product from the user on the EC site. At this time, when the trunk of the vehicle 10A has been selected as a delivery address on an order input page on the EC site, the order receipt processing unit 624 makes an inquiry about vehicle use schedule information to the center server 30 via the communication processing unit 621. Thus, the order receipt processing unit 624 is able to acquire the latest vehicle use schedule information via the communication processing unit 621, so, for example, when a designated delivery date and time already conflicts with another schedule, the order receipt processing unit 624 is able to take action, such as requesting a change of a delivery date and time.

As described above, a trunk delivery service intended for items other than products ordered on the EC site is also conceivable. In this case, similarly, the delivery management server 50 just needs to acquire the latest vehicle use schedule information from the center server 30. Thus, when a delivery date and time of a package to the trunk of the vehicle 10A designated by a regular user of the vehicle 10A conflicts with another schedule, the delivery management server 50 is able to take action, such as requesting a change of the delivery date and time.

As described above, the processing device 32 of the center server 30 includes the communication processing unit 321, the condition determination unit 322, the authentication key issuance unit 323, the location information management unit 324, the schedule management unit 325, the registration management unit 326, and the storage unit 320.

When the condition determination unit 322 has received an authentication key arrangement request from the delivery management server 50 via the communication processing unit 321, the condition determination unit 322 determines whether the authentication key arrangement request is a regular authentication key arrangement request. For example, the condition determination unit 322 determines whether the authentication key arrangement request is a regular authentication key arrangement request based on the service login ID of the delivery site, included in the authentication key arrangement request, and predetermined authentication information (for example, an ID and a password, or the like) corresponding to the delivery management server 50.

When the condition determination unit 322 determines that the authentication key arrangement request is a regular authentication key arrangement request, the authentication key issuance unit 323 identifies the vehicle 10A corresponding to the authentication key arrangement request based on the user and service registration information DB of the storage unit 320. The authentication key issuance unit 323 issues an authentication key with limited permission that limits the number of times the authentication key is available (for example, the number of times the authentication key is available is one) and that only allows the trunk lid to be locked or unlocked for a limited time (for example, usable within only a time length of several minutes to several tens of minutes from delivery of the authentication key). Thus, it is possible to prevent a delivery person from using the vehicle 10A without permission and improve security. The authentication key issuance unit 323 delivers an authentication key to the mobile terminal 20Ac of a delivery person via the communication processing unit 321. The delivery person is identified by the authentication key arrangement request.

For example, any method, such as a known mathematical method and a method using bidirectional communication between the center server 30 and the vehicle 10, may be employed as a method of limiting the available period of an authentication key, the number of times an authentication key is available, or the like.

The location information management unit 324 transmits a location information request to the vehicle 10A via the communication processing unit 321 in response to an inquiry about the current location of the vehicle 10A from the delivery management server 50. The inquiry is received by the communication processing unit 321. Thus, the DCM 14 of the vehicle 10A returns the location information of the vehicle 10A, which is input from the GPS module 13, to the center server 30 in response to the location information request from the center server 30. The location information management unit 324 is able to acquire the current location information of the vehicle 10A via the communication processing unit 321. The location information management unit 324 returns the current location information acquired from the vehicle 10A to the delivery management server 50 via the communication processing unit 321.

The schedule management unit 325 returns the latest vehicle use schedule information saved in the storage unit 320 to the EC server 60 via the communication processing unit 321 in response to an inquiry from the EC server 60. The inquiry is received by the communication processing unit 321.

As described above, the registration management unit 326 registers a regular user (child user) who uses various services including the trunk delivery service in response to a user registration request that is received from the mobile terminal 20Aa of the owner user by the communication processing unit 321. As described above, the registration management unit 326 also registers the regular user of the vehicle 10A with the trunk delivery service in response to a service registration request that is received from the mobile terminal 20Aa of the owner user by the communication processing unit 321. As described above, when the registration management unit 326 has completed registration with various services including the trunk delivery service, the registration management unit 326 also provides a notification of completion of registration to the mobile terminal 20Aa or the mobile terminal 20Ab, corresponding to the regular user to be registered, via the communication processing unit 321. When the registration management unit 326 has completed registration with the trunk delivery service, the registration management unit 326 transmits a service registration completion notification including service link information to the delivery management server 50 and the EC server 60 that manage operations of the service intended for registration via the communication processing unit 321.

As described above, the processing device 23 of the mobile terminal 20Ac of a delivery person includes the communication processing unit 231, the communication processing unit 232, the authentication key acquisition unit 233, the authentication requesting unit 234, and the lock/unlock requesting unit 235.

In the present embodiment, description will be made on the assumption that the functions of the authentication key acquisition unit 233, authentication requesting unit 234, and lock/unlock requesting unit 235 of the mobile terminal 20Ac become available to the delivery person when the key application is launched.

The authentication key acquisition unit 233 transmits an authentication key acquisition request to the delivery management server 50 via the communication processing unit 232 in response to a predetermined operation of the delivery person. At this time, the authentication key acquisition request includes the above-described delivery item information saved in the storage unit 230 in advance. Thus, the delivery management server 50 transmits an authentication key arrangement request to the center server 30 in response to the authentication key acquisition request, and the center server 30 delivers an authentication key to the mobile terminal 20Ac in response to the authentication key arrangement request, with the result that the mobile terminal 20Ac acquires the authentication key. Thus, since the mobile terminal 20Ac is able to lock or unlock the trunk lid of the vehicle 10A based on the functions of the communication processing unit 231, authentication requesting unit 234 and lock/unlock requesting unit 235, the delivery person is allowed to deliver a requested item to the trunk of the vehicle 10A, lock the trunk of the vehicle 10A as it was, and leave.

Details of Components Related to C2C Car Sharing Service

Next, components related to the C2C car sharing service in the authentication key management system 1 will be described with reference to FIG. 5.

Figure 5:
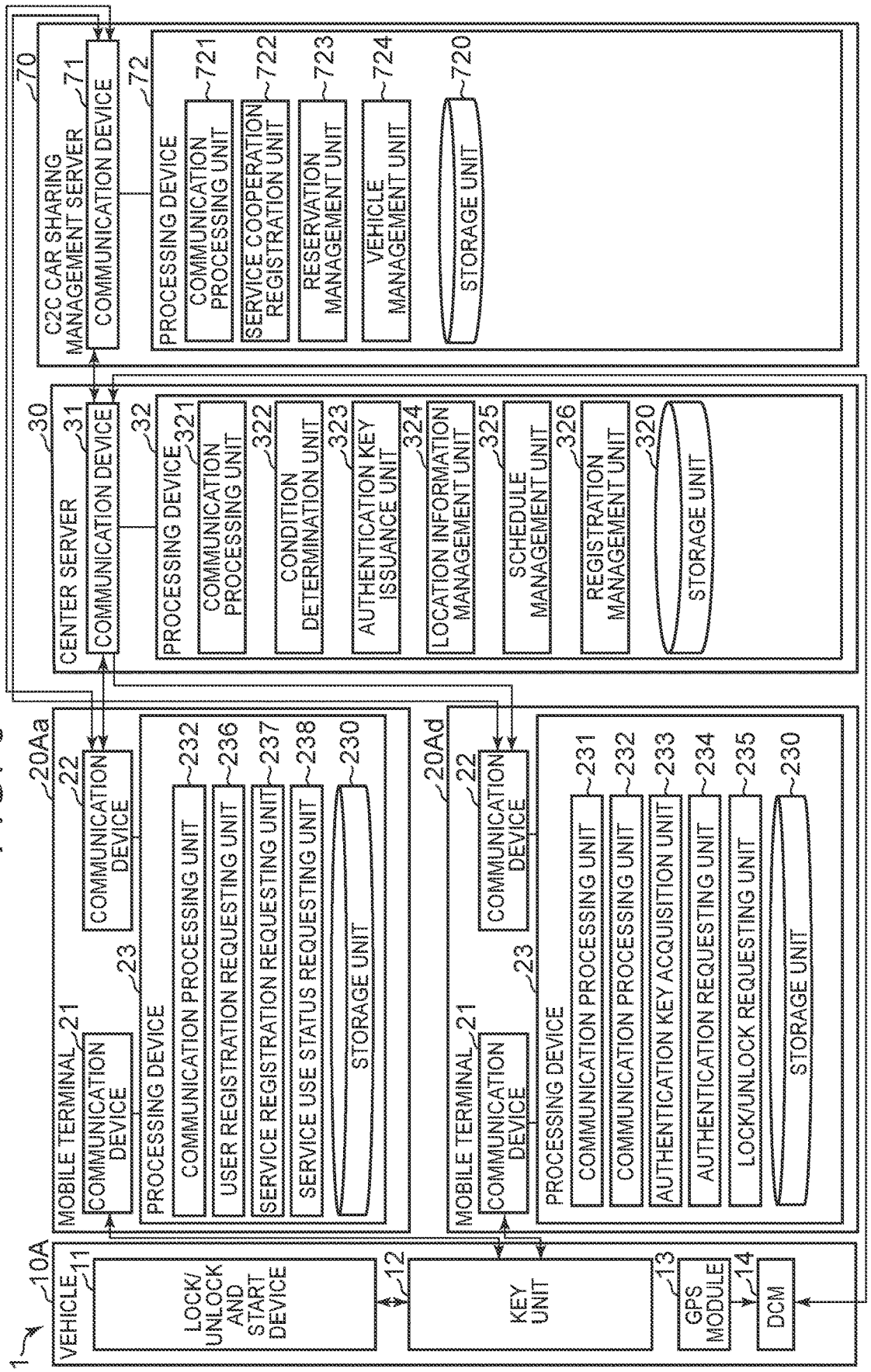
FIG. 5 is a block diagram that mainly shows an example of components related to a C2C car sharing service in the authentication key management system.

FIG. 5 is a block diagram that mainly shows an example of components related to the C2C car sharing service in the authentication key management system 1. Hereinafter, for FIG. 5, components related to the C2C car sharing service in the authentication key management system 1 will be mainly described, and the overlap description of components that overlap with the components related to the above-described key sharing service, and the like, is omitted as much as possible.

As described above, the processing device 23 of the mobile terminal 20Aa owned by the owner user of the vehicle 10A includes the communication processing unit 232, the user registration requesting unit 236, the service registration requesting unit 237, and the service use status requesting unit 238.

As described above, the user registration requesting unit 236 requests registration of the regular user (child user) of the vehicle 10A, who uses various services including the C2C car sharing service, to the center server 30 in response to a predetermined operation of the owner user.

As described above, the service registration requesting unit 237 requests registration of each registered regular user (the owner user or the child user) with various services including the C2C car sharing service to the center server 30 in response to a predetermined operation of the owner user.

For example, the service registration requesting unit 237 transmits a service registration request for using the C2C car sharing service to the center server 30. The service registration request includes a service login ID of a website for users who use the C2C car sharing service corresponding to the C2C car sharing management server 70 (hereinafter, referred to as C2C car sharing site) as service link information. The service login ID corresponds to the regular user of the vehicle 10A, who is to be registered.

As described above, the service use status requesting unit 238 requests information related to the use statuses of various services, including the C2C car sharing service, by the regular user of the vehicle 10A (service use status information) to the center server 30 in response to a predetermined operation of the owner user. The regular user of the vehicle 10A has been registered in association with the owner user ID.

The C2C car sharing management server 70 includes a communication device 71 and the processing device 72.

The communication device 71 is any device that bidirectionally carries out communication with each of the mobile terminals 20 and the center server 30 through a predetermined communication network.

The processing device 72 includes, for example, a communication processing unit 721, a service cooperation registration unit 722, a reservation management unit 723, and a vehicle management unit 724 as functional units that are implemented by executing one or more programs stored in the ROM or the auxiliary storage device on the CPU. The processing device 72 also includes the storage unit 720 that is implemented as a storage area, such as the auxiliary storage device of the server computer.

Description will be made on the assumption that information that identifies the vehicle 10A for rent has been already registered (saved) in the storage unit 720 through the C2C car sharing site by the regular user (owner user) of the vehicle 10A in association with a service login ID.

The communication processing unit 721 controls the communication device 71, and exchanges various signals, such as control signals and information signals, with each of the mobile terminals 20 and the center server 30.

The service cooperation registration unit 722 registers information for cooperation between the center server 30 and the C2C car sharing management server 70, related to usage of the C2C car sharing service by the regular user of the vehicle 10A, in response to a service registration completion notification that is received from the center server 30 by the communication processing unit 721.

For example, the service cooperation registration unit 722 adds a flag to a service login ID included in a service registration completion notification in the user management DB for managing users on the C2C car sharing site constructed in the storage unit 720. The flag indicates that the user corresponding to the service login ID is a letter of the vehicle 10A in the C2C car sharing service. Thus, the C2C car sharing management server 70 is able to cause the center server 30 to deliver an authentication key to the mobile terminal 20Ad of a renter, as will be described later, by transmitting an authentication key arrangement request including a service login ID corresponding to the regular user of the vehicle 10A, who is a letter, to the center server 30.

The reservation management unit 723 manages reservations for the use of the vehicle 10A. The reservations are made through the C2C car sharing site, or the like.

For example, the reservation management unit 723 receives registration of a rentable date and time of the vehicle 10A from the regular user of the vehicle 10A through the C2C car sharing site, or the like, and registers (saves) the received rentable date and time in the storage unit 720. At this time, the reservation management unit 723 makes an inquiry about vehicle use schedule information to the center server 30 via the communication processing unit 721. Thus, the reservation management unit 723 is able to acquire the latest vehicle use schedule information via the communication processing unit 721. For this reason, for example, when the rentable date and time received from the regular user of the vehicle 10A already conflicts with another schedule, the C2C car sharing management server 70 is able to take action, such as requesting a change of the rentable date and time and registering the date and time obtained by excluding the conflicting time from the received rentable date and time as a rentable date and time.

For example, the reservation management unit 723 also receives a reservation for the use of the vehicle 10A within the rentable date and time of the vehicle 10A. The rentable date and time of the vehicle 10A is saved in the storage unit 720. As the reservation management unit 723 receives a reservation for the use of the vehicle 10A from a user who is a renter through the C2C car sharing site, the reservation management unit 723 updates information pertaining to a rental schedule of the vehicle 10A (rental schedule information). The rental schedule information is saved in the storage unit 720.

For example, when the communication processing unit 721 has received an authentication key acquisition request from the mobile terminal 20Ad of the renter of the vehicle 10A, the reservation management unit 723 determines whether the authentication key acquisition request is a regular authentication key acquisition request. Specifically, the reservation management unit 723 may carry out the determination based on the service login ID and password of the C2C car sharing site, included in the authentication key acquisition request, and a relation with a reservation date and time (for example, whether the date and time of receipt of the authentication key acquisition request falls within the reservation date and time, whether a period of time from the date and time of receipt of the authentication key acquisition request to a start date and time is shorter than a predetermined time, or the like). When the authentication key acquisition request is a regular authentication key acquisition request, the reservation management unit 723 transmits an authentication key arrangement request to the center server 30 via the communication processing unit 721. At this time, the authentication key arrangement request includes information for identifying the mobile terminal 20Ad of the renter of the vehicle 10A. The information for identifying the renter of the vehicle 10A may be, for example, an authentication ID to get user authentication (hereinafter, referred to as renter ID for the sake of convenience) in the center server 30 in order for the renter of the vehicle 10A to use the function of the authentication key acquisition unit 233 of the mobile terminal 20Ad. Thus, the mobile terminal 20Ad of the renter of the vehicle 10A is able to acquire an authentication key from the center server 30.

The vehicle management unit 724 manages the vehicle 10A for rent.

For example, the vehicle management unit 724 makes an inquiry about the current location information of the vehicle 10A to the center server 30 via the communication processing unit 721 before a reservation date and time of the vehicle 10A (for example, a period from several tens of minutes before to just before). The vehicle management unit 724 acquires the current location information of the vehicle 10A via the communication processing unit 721. The current location information is returned from the center server 30 in response to the inquiry. Thus, before a scheduled rental date and time (reservation date and time) of the vehicle 10A, it is possible to determine, for example, whether the vehicle 10A has returned to a designated place. For this reason, when the vehicle 10A has not returned to a designated place, the C2C car sharing management server 70 is able to take action, such as issuing an alarm to the regular user who is the letter of the vehicle 10A to return to the designated place through an electric mail or a predetermined application that cooperates with the C2C car sharing site and that is installed onto the mobile terminal 20Aa or the mobile terminal 20Ab.

As described above, the processing device 32 of the center server 30 includes the communication processing unit 321, the condition determination unit 322, the authentication key issuance unit 323, the location information management unit 324, the schedule management unit 325, the registration management unit 326, and the storage unit 320.

When the communication processing unit 321 has received an authentication key arrangement request from the C2C car sharing management server 70, the condition determination unit 322 determines whether the authentication key arrangement request is a regular authentication key arrangement request. For example, the condition determination unit 322 determines whether the authentication key arrangement request is a regular authentication key arrangement request based on service link information (a service login ID of the C2C car sharing site, or the like) included in the authentication key arrangement request or predetermined authentication information (for example, an ID and a password, or the like) corresponding to the C2C car sharing management server 70.

When the condition determination unit 322 determines that the authentication key arrangement request is a regular authentication key arrangement request, the authentication key issuance unit 323 identifies the vehicle 10A corresponding to the authentication key arrangement request based on the user and service registration information DB of the storage unit 320. The authentication key issuance unit 323 issues an authentication key for a limited time (for example, an authentication key available only within a reservation date and time of the vehicle 10A, included in the authentication key arrangement request, and buffer periods before and after the reservation date and time). The authentication key issuance unit 323 delivers the authentication key to the mobile terminal 20Ad of the renter of the vehicle 10A via the communication processing unit 321. The renter of the vehicle 10A is identified by the authentication key arrangement request.

The C2C car sharing service may include, for example, a service for renting only the trunk of the vehicle 10A (C2C trunk sharing service). In the case of a vehicle trunk rental service, the authentication key issuance unit 323 just needs to issue an authentication key with limited permission that only allows the trunk lid to be locked or unlocked. Thus, it is possible to limit an object for rent in C2C car sharing to the trunk only. Thus, for example, a trunk delivery service for allowing a person to rent the trunk of the vehicle 10A for rent during a trip and get delivery of purchased products for use during the trip to the rented trunk may be realized.

The location information management unit 324 transmits a location information request to the vehicle 10A via the communication processing unit 321 in response to an inquiry about the current location of the vehicle 10A. The inquiry is received from the C2C car sharing management server 70 by the communication processing unit 321. Thus, the location information management unit 324 is able to acquire the current location information from the vehicle 10A via the communication processing unit 321. The location information management unit 324 returns the current location information acquired from the vehicle 10A to the C2C car sharing management server 70 via the communication processing unit 321.

The schedule management unit 325 transmits the latest vehicle use schedule information to the vehicle 10A via the communication processing unit 321 in response to the inquiry about the current location of the vehicle 10A. The inquiry is received from the C2C car sharing management server 70 by the communication processing unit 321.

As described above, the registration management unit 326 registers a regular user (child user) who uses various services including the C2C car sharing service in response to a user registration request that is received from the mobile terminal 20Aa of the owner user by the communication processing unit 321. As described above, the registration management unit 326 also registers the regular user of the vehicle 10A with the C2C car sharing service in response to a service registration request that is received from the mobile terminal 20Aa of the owner user by the communication processing unit 321. As described above, when the registration management unit 326 has completed registration with various services including the C2C car sharing service, the registration management unit 326 also provides a notification of completion of registration to the mobile terminal 20Aa or the mobile terminal 20Ab, corresponding to the regular user to be registered, via the communication processing unit 321. When the registration management unit 326 has completed registration with the C2C car sharing service, the registration management unit 326 transmits a service registration completion notification including service link information to the C2C car sharing management server 70 that manages operations of the service intended for registration.

As described above, the processing device 23 of the mobile terminal 20Ad of the renter of the vehicle 10A includes the communication processing unit 231, the communication processing unit 232, the authentication key acquisition unit 233, the authentication requesting unit 234, the lock/unlock requesting unit 235, and the storage unit 230.

The authentication key acquisition unit 233 transmits an authentication key acquisition request to the C2C car sharing management server 70 via the communication processing unit 232 in response to a predetermined operation of the renter of the vehicle 10A. At this time, the authentication key acquisition request includes a service login ID of the C2C car sharing site. The service login ID corresponds to the renter of the vehicle 10A. Thus, the C2C car sharing management server 70 transmits an authentication key arrangement request to the center server 30 in response to the authentication key acquisition request, and the center server 30 delivers an authentication key to the mobile terminal 20Ad in response to the authentication key arrangement request, with the result that the mobile terminal 20Ad acquires the authentication key. Thus, the mobile terminal 20Ad is able to lock or unlock the doors of the vehicle 10A based on the functions of the communication processing unit 231, authentication requesting unit 234 and lock/unlock requesting unit 235. That is, with the C2C car sharing service, the renter of the vehicle 10A, who owns the mobile terminal 20Ad, is allowed to directly use the vehicle 10A, for example, lock or unlock the vehicle 10A or drive the vehicle 10A, with the use of the mobile terminal 20Ad without handing over a key to or from the regular users of the vehicle 10A. Similarly, each regular user of the vehicle 10A is allowed to rent the vehicle 10A to a person other than the regular users without handing over a key. For this reason, it is possible to improve convenience in renting the vehicle 10A between each regular user of the vehicle 10A and a person other than the regular users with the C2C car sharing service in the authentication key management system 1.

Details of Components Related to B2C Car Sharing Service

Next, components related to the B2C car sharing service in the authentication key management system 1 will be described with reference to FIG. 6.

Figure 6:
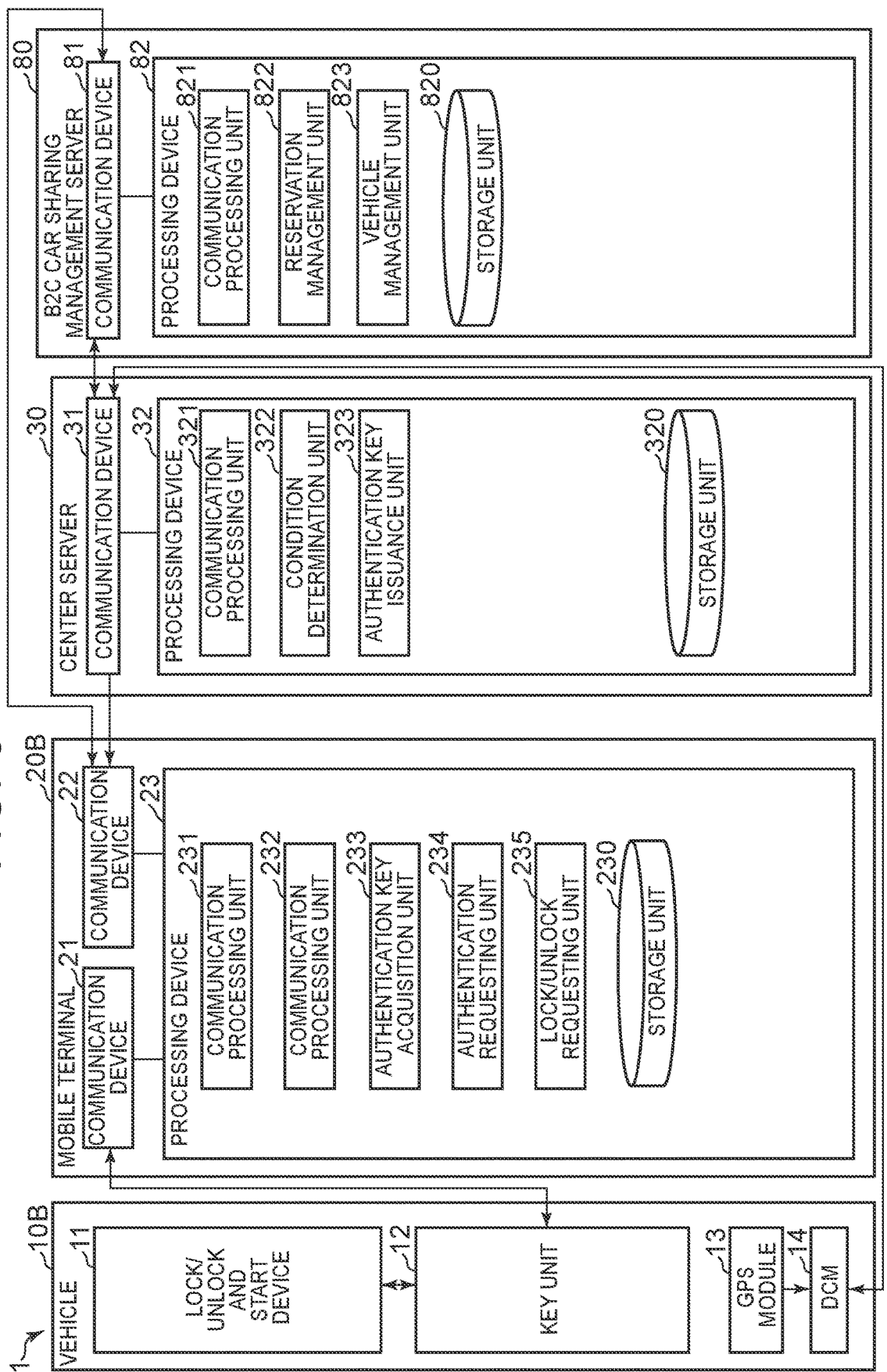
FIG. 6 is a block diagram that mainly shows an example of components related to a B2C car sharing service in the authentication key management system.

FIG. 6 is a block diagram that mainly shows an example of components related to the B2C car sharing service in the authentication key management system 1. Hereinafter, for FIG. 6, components related to the B2C car sharing service in the authentication key management system 1 will be mainly described, and the overlap description of components that overlap with the components related to the above-described key sharing service, and the like, is omitted as much as possible.

The B2C car sharing management server 80 includes a communication device 81 and the processing device 82.

The communication device 81 is any device that bidirectionally carries out communication with each of the mobile terminal 20B and the center server 30 through a predetermined communication network.

The processing device 82 includes, for example, a communication processing unit 821, a reservation management unit 822, and a vehicle management unit 823 as functional units that are implemented by executing one or more programs stored in the ROM or the auxiliary storage device on the CPU. The processing device 82 also includes the storage unit 820 that is implemented as a storage area, such as the auxiliary storage device of the server computer.

The communication processing unit 821 controls the communication device 81, and exchanges various signals, such as control signals and information signals, with each of the mobile terminal 20B and the center server 30.

The reservation management unit 822 manages reservations for the use of the vehicle 10B. The reservations are made through the B2C car sharing site, or the like.

For example, the reservation management unit 822 receives a reservation for the use of the vehicle 10B from a user who wants to rent the vehicle 10B (hereinafter, referred to as rent user) through a website that is operated by a business operator of the B2C car sharing management server 80, or the like (hereinafter, referred to as B2C car sharing site for the sake of convenience). The reservation management unit 822 saves information related to the received reservation for the use of the vehicle 10B (use reservation information) in the storage unit 820. At this time, the use reservation information includes, for example, information that identifies the intended vehicle 10B, information related to a use reservation date and time (a start date and time and an end date and time), a service login ID of the rent user on the B2C car sharing site, and the like.

For example, each time the reservation management unit 822 receives a reservation for the use of the vehicle 10B, the reservation management unit 822 updates information related to a use schedule of the vehicle 10B (vehicle use schedule information), saved in the storage unit 820. Thus, the B2C car sharing management server 80 is able to show available dates and times for reservation to the rent user by causing the B2C car sharing site to display the use schedule of the vehicle 10B.

For example, when the communication processing unit 821 has received an authentication key acquisition request from the mobile terminal 20B, the reservation management unit 822 determines whether the authentication key acquisition request is a regular authentication key acquisition request. Specifically, the reservation management unit 822 may carry out the determination based on the service login ID and password of the B2C car sharing site, corresponding to the rent user and included in the authentication key acquisition request, and a relation with a reservation date and time (for example, whether the date and time of receipt of the authentication key acquisition request falls within the reservation date and time, whether a period of time from the date and time of receipt of the authentication key acquisition request to a start date and time is shorter than a predetermined time, or the like). When the authentication key acquisition request is a regular authentication key acquisition request, the reservation management unit 822 transmits an authentication key arrangement request to the center server 30 via the communication processing unit 821. At this time, the authentication key arrangement request includes information for identifying the mobile terminal 20B of the rent user who rents the vehicle 10B. The information for identifying the rent user who rents the vehicle 10B may be, for example, an authentication ID to get user authentication (hereinafter, referred to as rent user ID for the sake of convenience) in the center server 30 in order for the rent user who rents the vehicle 10B to use the functions of the key application, corresponding to the authentication key acquisition unit 233, and the like, of the mobile terminal 20B. Thus, the mobile terminal 20B of the rent user who rents the vehicle 10B is able to acquire an authentication key from the center server 30.

The vehicle management unit 823 manages the vehicle 10B for rent.

For example, the vehicle management unit 823 makes an inquiry about the vehicle 10B parked around (for example, within several hundreds of meters, or the like, from) a place designated in a reservation to the center server 30 via the communication processing unit 821 before a reservation date and time of the vehicle 10B for a rent user (for example, several tens of minutes before). The vehicle management unit 823 acquires the location information of the vehicle 10B parked around the designated place via the communication processing unit 821. The location information is returned from the center server 30 in response to the inquiry. Thus, before the date and time at which the renter starts using the vehicle 10B, the vehicle management unit 823 is able to identify one or plurality of vehicles 10B parked around the designated place, and determine, for example, which vehicle 10B to rent.

For example, the vehicle management unit 823 makes an inquiry about the location information of the vehicle 10B in a designated area to the center server 30 via the communication processing unit 821 in response to a request to search for a vehicle 10B in the designated area from the rent user on the B2C car sharing site. The vehicle management unit 823 acquires the location information of the vehicle 10B in the designated area via the communication processing unit 821. The location information is returned from the center server 30 in response to the inquiry. Thus, the vehicle management unit 823 is, for example, able to show the location information of the intended vehicle 10B to the rent user who wants to immediately rent the vehicle 10B in the designated area on the B2C car sharing site.

As described above, the processing device 32 of the center server 30 includes the communication processing unit 321, the condition determination unit 322, the authentication key issuance unit 323, and the storage unit 320.

When the communication processing unit 321 has received an authentication key arrangement request from the B2C car sharing management server 80, the condition determination unit 322 determines whether the authentication key arrangement request is a regular authentication key arrangement request. For example, the condition determination unit 322 determines whether the authentication key arrangement request is a regular authentication key arrangement request based on whether the rent user ID included in the authentication key arrangement request is the authentication ID registered in the storage unit 320 or predetermined authentication information (for example, an ID and a password, or the like) corresponding to the B2C car sharing management server 80.

When the condition determination unit 322 determines that the authentication key arrangement request is a regular authentication key arrangement request, the authentication key issuance unit 323 issues an authentication key for a limited time (for example, an authentication key available only within a reservation date and time of the vehicle 10B, included in the authentication key arrangement request, and buffer periods before and after the reservation date and time). The authentication key issuance unit 323 delivers the authentication key to the mobile terminal 20B of the rent user who rents the vehicle 10B via the communication processing unit 321. The rent user is identified by the authentication key arrangement request.

As described above, the processing device 23 of the mobile terminal 20B of the rent user who rents the vehicle 10B includes the communication processing unit 231, the communication processing unit 232, the authentication key acquisition unit 233, the authentication requesting unit 234, the lock/unlock requesting unit 235, and the storage unit 230.

The authentication key acquisition unit 233 transmits an authentication key acquisition request to the B2C car sharing management server 80 via the communication processing unit 232 in response to a predetermined operation of the rent user who rents the vehicle 10B. At this time, the authentication key acquisition request includes a service login ID of the B2C car sharing site, or the like. The service login ID corresponds to the rent user who rents the vehicle 10B. Thus, the B2C car sharing management server 80 transmits an authentication key arrangement request to the center server 30 in response to the authentication key acquisition request, and the center server 30 delivers an authentication key to the mobile terminal 20B in response to the authentication key arrangement request, with the result that the mobile terminal 20B acquires the authentication key. Thus, the mobile terminal 20B is able to lock or unlock the doors of the vehicle 10B based on the functions of the communication processing unit 231, authentication requesting unit 234 and lock/unlock requesting unit 235. That is, with the B2C car sharing service, the rent user who rents the vehicle 10B and owns the mobile terminal 20B is allowed to directly use the vehicle 10B, for example, lock or unlock the vehicle 10B or drive the vehicle 10B, with the use of the mobile terminal 20B without handing over a key to or from the business operator, or the like, of the vehicle 10B. For this reason, it is possible to improve convenience of the rent user who rents the vehicle 10B with the B2C car sharing service in the authentication key management system 1.

Details of Characteristic Operations of Center Server

Next, the characteristic process flow of the center server 30 will be described with reference to FIG. 7 and FIG. 9.

Figure 7:
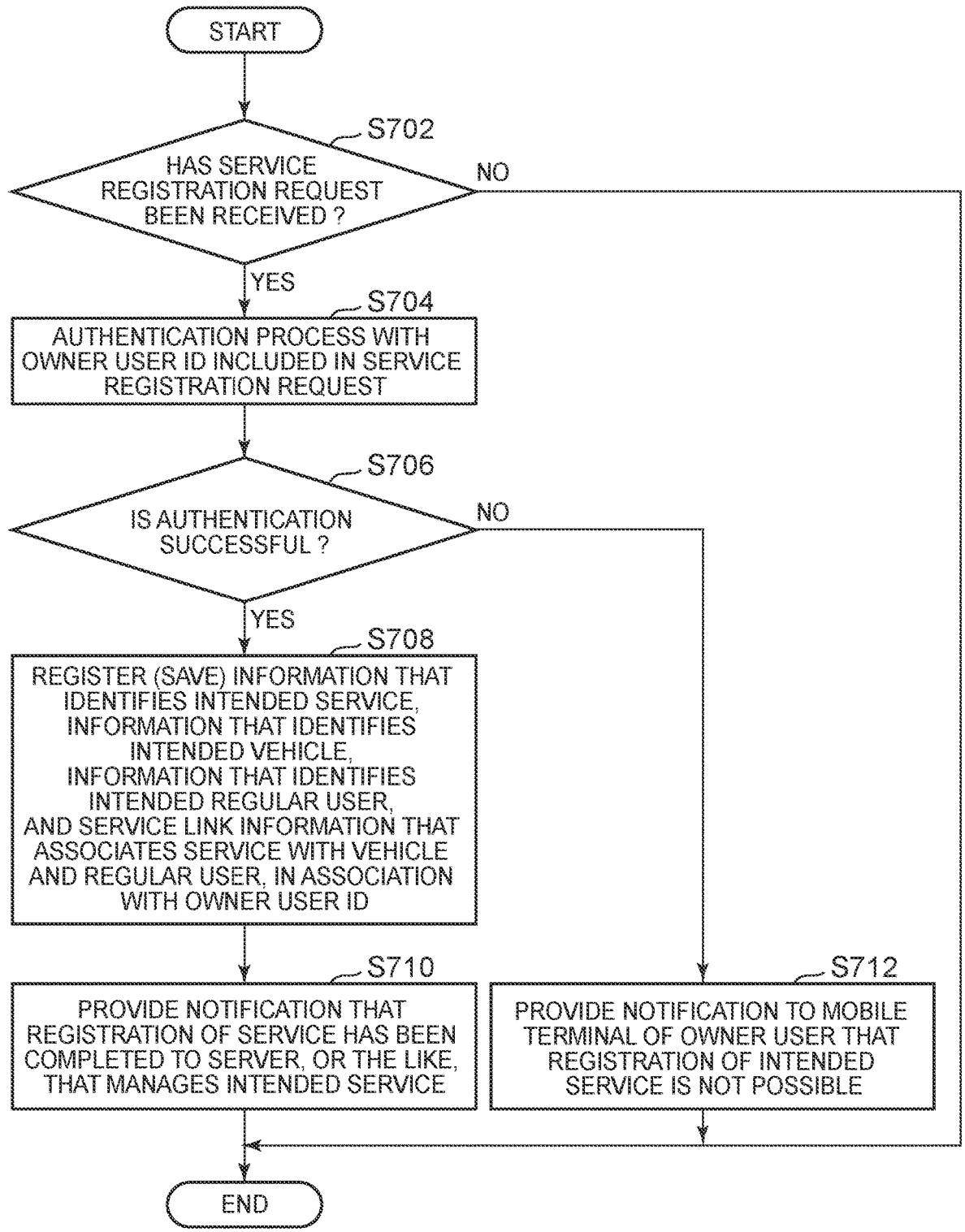
FIG. 7 is a flowchart that schematically shows an example of a service registration process that is executed by a center server.

FIG. 7 is a flowchart that schematically shows an example of a registration process for a regular user of the vehicle 10A to use the above-described various services (service registration process), which is executed by the center server 30 according to the present embodiment. A process according to this flowchart is repeatedly executed at predetermined processing intervals. Hereinafter, this also applies to the flowchart of FIG. 9.

In step S702, the registration management unit 326 determines whether the communication processing unit 321 has received a service registration request. When a service registration request has been received, the registration management unit 326 proceeds to step S704; otherwise, the registration management unit 326 ends the current process.

In step S704, the registration management unit 326 executes an authentication process using an owner user ID and password included in the service registration request received by the communication processing unit 321.

In step S706, the registration management unit 326 determines whether authentication is successful, that is, whether the service registration request is a regular service registration request. When the service registration request is a regular service registration request, the registration management unit 326 proceeds to step S708; otherwise, the registration management unit 326 proceeds to step S712.

In step S708, the registration management unit 326 registers (saves) service unique information (service ID) corresponding to an intended service, vehicle unique information (key unit ID) corresponding to a vehicle 10A, and a regular user ID (an owner user ID or a child user ID) corresponding to a regular user who uses the service in the user and service registration information DB of the storage unit 320 in association with the owner user ID included in the service registration request.

In step S710, the registration management unit 326 transmits a notification that registration with the intended service has completed (service registration completion notification) to the key sharing management unit 327 or any one of the service management servers 40, corresponding to the intended service. Similarly, the registration management unit 326 provides a notification that registration with the intended service has completed to the mobile terminal 20Aa of the owner user and the mobile terminal 20Ab of the regular user (child user) to be registered. The registration management unit 326 ends the current process.

On the other hand, in step S712, the registration management unit 326 provides a notification that registration with the intended service is not allowed (that is, user authentication has failed) to the mobile terminal 20Aa of the owner user, and ends the current process.

Figure 8:
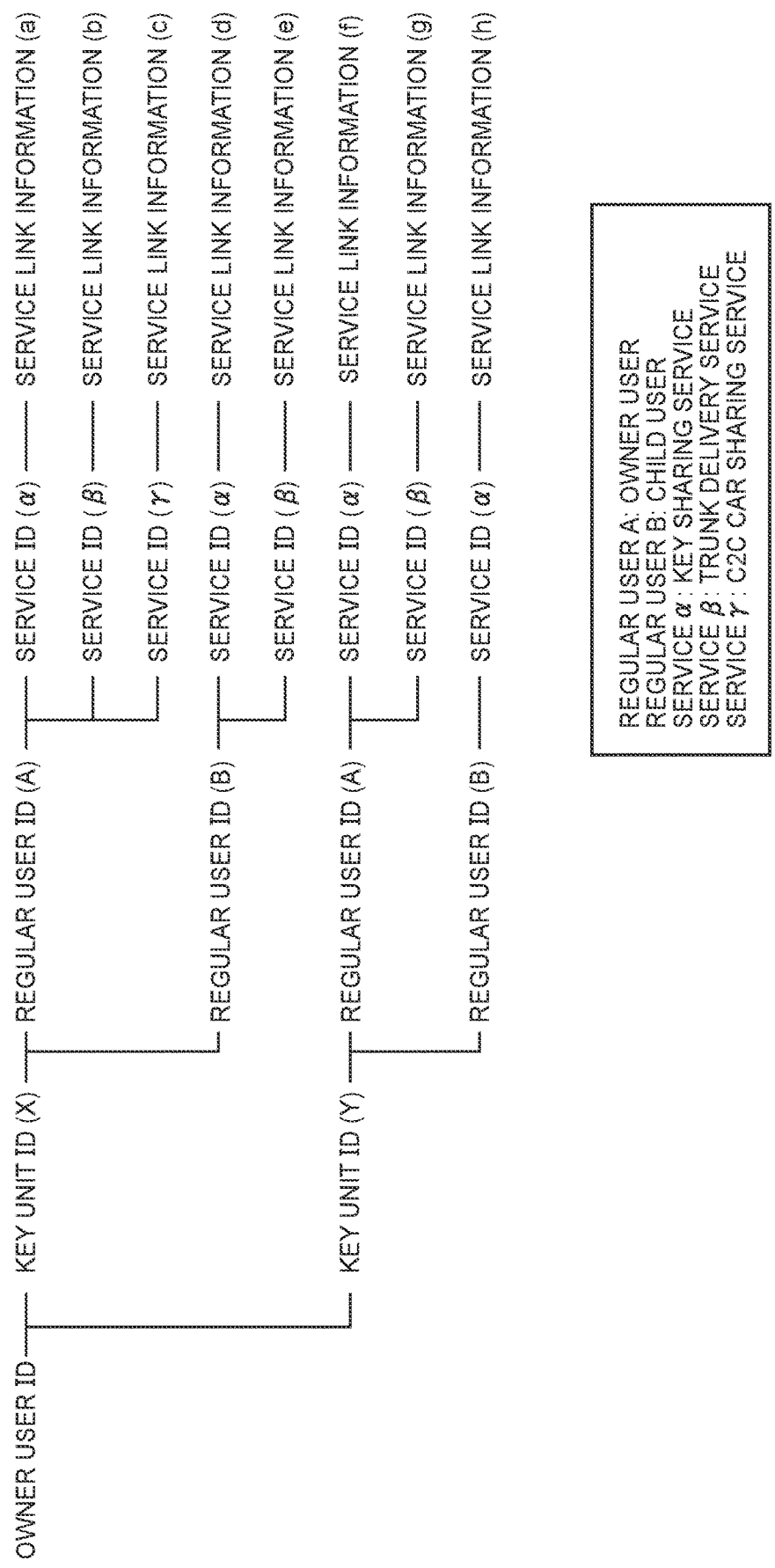
FIG. 8 is a view that schematically shows an example of a user and service registration information DB.

For example, FIG. 8 is a view that schematically shows an example of the user and service registration information DB constructed in the storage unit 520 with the process of FIG. 7. Specifically, FIG. 8 is a view that shows a correspondence relation between an owner user ID and key unit IDs, regular user IDs, service IDs and pieces of service link information, associated with the owner user ID, which are registered in the user and service registration information DB of the storage unit 520.

In this example, the owner user owns two vehicles 10A, and one child user who is a member of the family, or the like, of the owner user is registered as a regular user who is allowed to use various services. Services that the owner user is allowed to use with the first vehicle 10A include a key sharing service, a trunk delivery service, and a C2C car sharing service, and services that the child user is allowed to use with the first vehicle 10A include the key sharing service and the trunk delivery service. Services that the owner user is allowed to use with the second vehicle 10A include the key sharing service and the trunk delivery service, and services that the child user is allowed to use with the second vehicle 10A include only the key sharing service.

In this way, the registration management unit 326 registers permission for each regular user of the vehicle 10A to use a predetermined service using the vehicle 10A in the user and service registration information DB. The permission is permission to cause the authentication key issuance unit 323 to deliver key information (authentication key) to the mobile terminal 20Ac or the mobile terminal 20Ad, owned by a third party concerned with the service, other than each regular user of the vehicle 10A (authentication key arrangement permission) as an external device (any one of the service management servers 40, or the like) concerned with the service transmits a predetermined request signal (authentication key arrangement request).

Thus, the center server 30 by itself is able to manage permission to cause any one of the service management servers 40, concerned with the service, such as the C2C car sharing service and the trunk delivery service, to deliver an authentication key to the mobile terminal 20Ac or mobile terminal 20Ad of the third party concerned with the service, such as a renter of the vehicle 10A and a delivery person. For this reason, for example, even when authentication information, such as an ID and a password, or the like, for causing any one of the service management servers 40 to deliver an authentication key has leaked, since the ID and the password are unique to the corresponding service, it is not possible to perform registration with a new service with the use of the authentication information. In addition, the center server 30 normally often restricts access from a user other than the regular users of the vehicle 10A, and it is originally difficult for a third party in bad faith to perform registration with a service in the center server 30. Therefore, the center server 30 is able to reduce registration with a service using the vehicle 10A by a third party in bad faith without permission and usage of the vehicle 10A by a third party in bad faith without permission through a service registered without permission.

As shown in FIG. 8, the registration management unit 326 saves an intended vehicle 10A (key unit ID) that is used in a service, a regular user (regular user ID) of the vehicle 10A, who uses the service, the intended service (service ID), and service link information in the storage unit 520 in association with an owner user ID. The service link information associates the intended service with the vehicle 10A and the regular user. That is, the registration management unit 326 registers authentication key arrangement permission of each of the key sharing management unit 327 and the service management servers 40 for the regular user of the vehicle 10A to use a service using the vehicle 10A in association with an owner user ID.

Thus, the center server 30 is able to monistically manage information related to a service to be registered with an owner user ID as a source. The center server 30 is also able to manage authentication key arrangement permission in association with unique information (owner user ID) that corresponds to an owner user and that is commonly only available to the owner user. Therefore, since unique information corresponding to an owner user is required at the time of registration with a service, the center server 30 is able to reduce, for example, registration with a service using a vehicle 10A by a regular user of the vehicle 10A other than the owner user (for example, a member of a family of the owner user, a close friend of the owner user, or the like) without permission.

As shown in FIG. 8, the registration management unit 326 saves service link information for delivering an authentication key to the mobile terminal 20Ac or mobile terminal 20Ad of a third party (for example, a delivery person of the trunk delivery service or a renter of the C2C car sharing service) other than a regular user of a vehicle 10A, concerned with any one of various services, and information that identifies the vehicle 10A (key unit ID), different from the service link information, in the storage unit 520, in association with each other. Thus, the center server 30 by itself is able to manage service link information that is required for the mobile terminal 20Ac or mobile terminal 20Ad of a third party concerned with a service, such as a delivery person of the trunk delivery service and a renter of the C2C car sharing service, to acquire an authentication key. Specifically, the center server 30 is able to manage service link information in association with information unique to a vehicle 10A (vehicle unique information). For this reason, without providing a service provider with vehicle unique information for identifying a vehicle 10A, it is possible to identify the vehicle 10A to be locked or unlocked with an authentication key from service link information included in a request to deliver an authentication key (authentication key arrangement request), which is received from an external device concerned with the service (any one of the service management servers 40), a mobile terminal 20, or the like. That is, even if a third party in bad faith attempts to register a service in the center server 30 without permission, not only service link information but also vehicle unique information that is commonly available to only a regular user, or the like, such as an owner user of a vehicle 10A, is required. Therefore, the center server 30 is able to reduce registration with a service using the vehicle 10A by a third party in bad faith without permission and usage of the vehicle 10A by a third party in bad faith without permission through a service registered without permission.

In this example, the vehicle unique information is a key unit ID unique to the key unit 12 mounted on each vehicle 10A. Thus, the center server 30 is able to manage service link information in association with unique information (key unit ID) of an in-vehicle device (key unit 12) concerned with the function of unlocking or starting the vehicle 10A upon reception of a signal transmitted from the mobile terminal 20, not in association with general information unique to the vehicle 10A, such as VIN. Therefore, since unique information of an in-vehicle device, which there is a limited opportunity for a third party to see, is employed, the center server 30 is able to further reduce registration with a service using the vehicle 10A without permission and usage of the vehicle 10A without permission through a service registered without permission.

Subsequently, FIG. 9 is a flowchart that schematically shows an example of a service use status information providing process that is executed by the center server 30.

In step S902, the registration management unit 326 determines whether the communication processing unit 321 has received a service use status request. When the communication processing unit 321 has received a service use status request, the registration management unit 326 proceeds to step S904; otherwise, the registration management unit 326 ends the current process.

In step S904, the registration management unit 326 generates service use status information of a type designated by the service use status request.

In step S906, the registration management unit 326 delivers the service use status information to the mobile terminal 20Aa via the communication processing unit 321, and ends the current process. Thus, an image corresponding to the service use status information (service use status image) delivered from the center server 30 is displayed on the display 24 of the mobile terminal 20Aa. For this reason, the owner user is allowed to monistically see the use of each service using the vehicle 10A over a plurality of regular users and a plurality of services, which are registered in the storage unit 320 (user and service registration information DB) of the center server 30.

For example, FIG. 10 is a view that shows specific examples of service use status images that are displayed on the display 24 of the mobile terminal 20Aa of the owner user. Specifically, FIG. 10 shows specific examples, that is, five types of service use status images 1001, 1002, 1003, 1004, 1005 that are displayed on the display 24 of the mobile terminal 20Aa.

The service use status image 1001 shows a list of vehicles 10A to be used in various services. The vehicles 10A have been registered in the storage unit 520 (user and service registration information DB) of the center server 30 in association with the owner user ID. In this example, vehicle images that schematically show two vehicles 10A registered by the owner user are tiled vertically in the service use status image 1001.

The service use status image 1002 shows a list of services that have been registered in association with the owner user ID. In this example, business operator names that provide registered services are shown in the service use status image 1002, and, specifically, the service use status image 1002 shows that "XX Transport" that provides a trunk delivery service and "YY Car Sharing" that provides a C2C car sharing service have been registered.

The service use status image 1003 shows a list of regular users registered in association with the owner user ID. In this example, human images that schematically show two regular users (the owner user and a child user) who use various services are tiled vertically in the service use status image 1003. In addition, a vehicle image that schematically shows a vehicle 10A that is used in various services that each regular user uses is shown to the right side of the human image of a corresponding one of the regular users in the service use status image 1003, and, specifically, the service use status image 1003 shows that one regular user uses various services with the use of a vehicle 10A and the other user uses various services with the use of two vehicles 10A.

The service use status image 1004 shows a use schedule of a vehicle 10A over all the regular users and all the services. All the regular users and all the services have been registered in association with the owner user ID. In this example, a use schedule corresponding to various services of a vehicle 10A for two regular users is shown in the service use status image 1004.

The service use status image 1005 shows a list of history records of locking or unlocking of a vehicle 10A with an authentication key. The history records are registered in association with the owner user ID. In this example, dates and times at which the vehicle 10A was locked or unlocked with an authentication key and delivery destinations (persons who locked or unlocked the vehicle 10A) of the authentication key used are shown in the service use status image 1005.

In this way, the registration management unit 326 transmits information related to a service (service use status information) to the mobile terminal 20Aa in response to a request from the mobile terminal 20Aa having the owner user ID via the communication processing unit 321. The service corresponds to authentication key arrangement permission associated with the owner user ID. Thus, the center server 30 is able to transmit information related to a registered service to a terminal (mobile terminal 20Aa) of the owner user in response to a request from the terminal having unique information corresponding to the owner user (owner user ID), that is, a request from the terminal of the owner user. For this reason, the owner user is allowed to see information related to registered services (for example, a list of registered services, a use schedule of vehicles that are used in all the services, and the like), which is displayed on a display, or the like, of the terminal. Therefore, the center server 30 is able to cause the owner user to monistically see information related to the registered services.

The registration management unit 326 transmits service use status information to the mobile terminal 20Aa in response to a request from the mobile terminal 20Aa having the owner user ID via the communication processing unit 321. The service use status information includes information related to a regular user of the vehicle 10A, other than the owner user. The regular user of the vehicle 10A corresponds to authentication key arrangement permission associated with the owner user ID. Thus, the center server 30 is able to transmit information related to the regular user of the vehicle 10A, other than the owner user, who uses registered services to a terminal of the owner user in response to a request from the terminal (mobile terminal 20Aa) of the owner user. For this reason, the owner user is allowed to see information related to the regular user of the vehicle 10A, other than the owner user, who uses registered services that are displayed on a display, or the like, of the terminal (for example, a list of users of various services, a use schedule of a vehicle over all the users, and the like). Therefore, the center server 30 is able to cause the owner user to monistically see information related to users of registered services (regular users of a vehicle, other than the owner user).

The embodiment of the disclosure is described in detail above; however, the disclosure is not limited to the specific embodiment. Various modifications or changes are applicable within the scope of the disclosure recited in the appended claims.

For example, in the above-described embodiment, the mobile terminal 20 transmits an authentication request including an authentication key to the key unit 12, the key unit 12 exchanges signals with the lock/unlock and start device 11 in response to an authentication result based on the authentication key, and locking or unlocking of the doors of the vehicle 10A or starting of the vehicle 10A is realized by the lock/unlock and start device 11; however, the disclosure is not limited to this mode.

Specifically, the function of the key unit 12 may be transferred to the mobile terminal 20, and locking or unlocking of the doors of the vehicle 10A or starting of the vehicle 10A may be realized by the lock/unlock and start device 11 as the mobile terminal 20 exchanges signals based on the above-described key information (internal key information) with a vehicle 10 (lock/unlock and start device 11) by LF radio waves and RF radio waves. In this case, the authentication key in the above-described embodiment just needs to be read as key information. That is, the center server 30 may issue key information instead of an authentication key and deliver the key information to the mobile terminal 20 with a similar method to the authentication key in the above-described embodiment. Thus, similar operation and advantageous effects to those of the above-described embodiment are obtained.

The function of the key unit 12 may be integrated into the lock/unlock and start device 11, and components related to communication between the lock/unlock and start device 11 and the key unit 12 and authentication related to the communication (the LF radio wave transmitter 111, the RF radio wave receiver 112, the collation ECU 113, the LF radio wave receiver 121, and the RF radio wave transmitter 122) may be omitted. In this case, when authentication of the mobile terminal 20 is successful based on an authentication key, the key ECU 124 may directly output an unlock or lock instruction to the body ECU 114 or a start instruction to the engine ECU 116, instead of the collation ECU 113, and cause the body ECU 114 to lock or unlock the doors of the vehicle 10 and cause the engine ECU 116 to start the vehicle 10. Thus, similar operation and advantageous effects to those of the above-described embodiment are obtained.

What is claimed is:

1. A key information management device comprising:
   an information processing device configured to
   i) deliver key information to a first mobile terminal as the first mobile terminal transmits a predetermined transmission signal toward a vehicle, the key information being information for unlocking the vehicle, starting the vehicle, or unlocking and starting the vehicle, and
   ii) register permission for a user of the vehicle to use a predetermined service using the vehicle, the permission being permission to cause the information processing device to deliver the key information to another third party mobile terminal of a third party concerned with the predetermined service, other than the user of the vehicle,
   wherein the information processing device is configured to register the permission further in association with unique information corresponding to an owner user of the vehicle, and
   wherein the information processing device is configured to transmit information related to the predetermined service to a second mobile terminal having the unique information corresponding to the owner user in response to a request from the first mobile terminal.

2. The key information management device according to claim 1, wherein:
   the predetermined service corresponds to the permission associated with the unique information corresponding to the owner user.

3. The key information management device according to claim 2, wherein:
   the information processing device is configured to store the permission for each user of the vehicle in association with the unique information corresponding to the owner user;
   the information processing device is configured to transmit information related to a user of the vehicle, other than the owner user, to the second mobile terminal having the unique information corresponding to the owner user in response to a request from the second mobile terminal having the unique information corresponding to the owner user; and
   the user of the vehicle, other than the owner user, corresponds to the permission associated with the unique information corresponding to the owner user.

4. The key information management device according to claim 1, further comprising a communication device configured to bidirectionally carry out communication with each of the vehicles, the mobile terminals, and the external server device through a predetermined communication network.

5. The key information management device according to claim 1, wherein the key information further includes information for locking the vehicle.

6. A key information management method that is executed by a key information management device, the key information management method comprising:
   delivering key information to a first mobile terminal as the first mobile terminal transmits a predetermined transmission signal toward a vehicle, the key information being information for unlocking the vehicle, starting the vehicle, or unlocking and starting the vehicle;
   registering permission for a user of the vehicle to use a predetermined service using the vehicle, the permission being permission to deliver the key information to another third party mobile terminal of a third party concerned with the predetermined service, other than the user of the vehicle;
   registering the permission further in association with unique information corresponding to an owner user of the vehicle; and
   transmitting information related to the predetermined service to a second mobile terminal having the unique information corresponding to the owner user in response to a request from the first mobile terminal.

7. A non-transitory computer-readable recording medium comprising a key information management program recorded on the recording medium, the key information management program causing an information processing device to execute instructions for:
   delivering key information to a first mobile terminal as the first mobile terminal transmits a predetermined transmission signal toward a vehicle, the key information being information for unlocking the vehicle, starting the vehicle, or unlocking and starting the vehicle;
   registering permission for a user of the vehicle to use a predetermined service using the vehicle, the permission being permission to deliver the key information to another third party mobile terminal of a third party concerned with the predetermined service, other than the user of the vehicle;
   registering the permission further in association with unique information corresponding to an owner user of the vehicle; and
   transmitting information related to the predetermined service to a second mobile terminal having the unique information corresponding to the owner user in response to a request from the first mobile terminal.

\* \* \* \* \*